United States Patent [19]

Murata et al.

[11] Patent Number: 6,029,180
[45] Date of Patent: Feb. 22, 2000

[54] INFORMATION PRESENTATION APPARATUS AND METHOD

[75] Inventors: Katsuyuki Murata, Tokyo; Miwako Doi; Takahiro Harashima, both of Kanagawa-ken, all of Japan

[73] Assignee: Kabushiki Kaisha Toshiba, Kawasaki, Japan

[21] Appl. No.: 08/812,739

[22] Filed: Mar. 6, 1997

[30] Foreign Application Priority Data

Mar. 19, 1996 [JP] Japan .................................. 8-062227

[51] Int. Cl.⁷ ........................................... G06F 17/21
[52] U.S. Cl. ................................. 707/501; 707/513
[58] Field of Search ........................ 707/1, 513, 501; 345/357; 395/200.48

[56] References Cited

U.S. PATENT DOCUMENTS

| | | | |
|---|---|---|---|
| 5,050,071 | 9/1991 | Harris et al. | 707/1 |
| 5,761,683 | 6/1998 | Logan et al. | 707/513 |
| 5,774,123 | 6/1998 | Matson | 345/357 |
| 5,802,299 | 9/1998 | Logan et al. | 395/200.48 |

*Primary Examiner*—James P. Trammell
*Assistant Examiner*—John Leonard Young
*Attorney, Agent, or Firm*—Finnegan, Henderson, Farabow, Garrett & Dunner, L.L.P.

[57] ABSTRACT

In the information presentation apparatus of the present invention, it is possible for the user to effectively present information relative to first information. A memory stores first information including at least one part corresponding to second information. The first information is displayed and the user indicates the part corresponding to the second information in the displayed first information. In response to the indication, a summary of the second information is read from a data file and stored in the memory. The summary is displayed in addition to the first information. Therefore, the user can previously know an outline of the second information.

37 Claims, 34 Drawing Sheets

```
<HTML>
<HEAD>
<TITLE> HTML FILE EX </TITLE>
</HEAD>
<BODY>
CONTENT
• • • • • •
<A HREF = "LINKED URL">
LINKED PART
</A>
• • • • • •
</BODY>
</HTML>
```

FIG. 1
*(PRIOR ART)*

```
#VRML V1.0 ASCII
SEPARATOR   {
    WWWANCHOR   {
        NAME "LINK URL"
        DESCRIPTION "CONE"
        CONE { }
    }
}
```

FIG. 2
*(PRIOR ART)*

```
<HTML>
<HEAD>
<TITLE> EXTENDED HTML FILE A </TITLE>
</HEAD>
<BODY>
CONTENT
• • • • • •
<INFO FILE = "SUMMARY FILE A">
<A HREF = "HTTP://HTML FILE B">
PATENT
</A>
</INFO>
• • • • • •
</BODY>
</HTML>
```

```
<HTML>
<HEAD>
<TITLE> EXTENDED HTML FILE A </TITLE>
</HEAD>
<BODY>
CONTENT
• • • • • •
<INFO DIRECT> SUMMARY -----
<A HREF = "HTTP://HTML FILE B">
PATENT -----
</A>
</INFO>

• • • • • •
<INFO MYREF = "#1">
PATENT A
</INFO>

• • • • • •
• • • • • •
<INFO NAME = "1">SUMMARY A </INFO
<INFO NAME = "2">SUMMARY B </INFO
<INFO NAME = "3">SUMMARY C </INFO
</BODY>
</HTML>
```

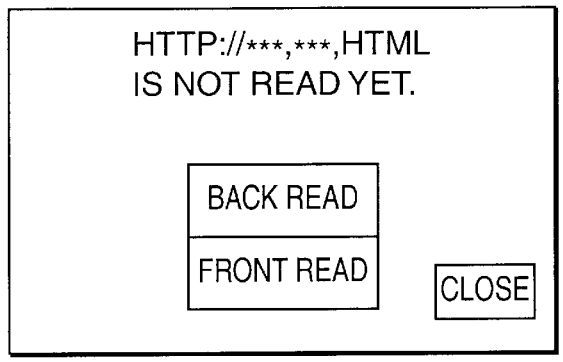
FIG. 23
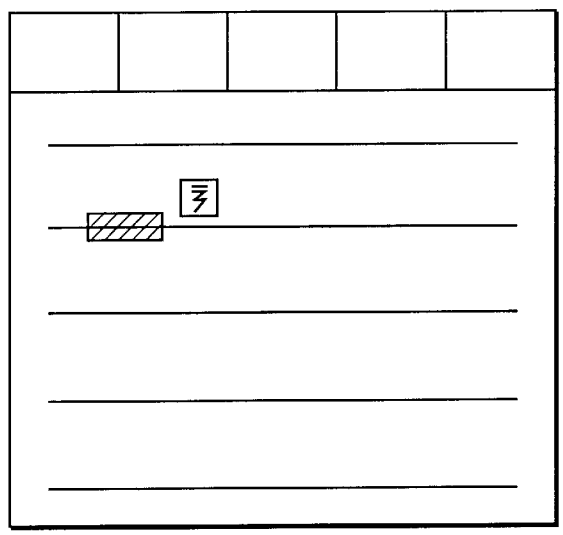
FIG. 24A
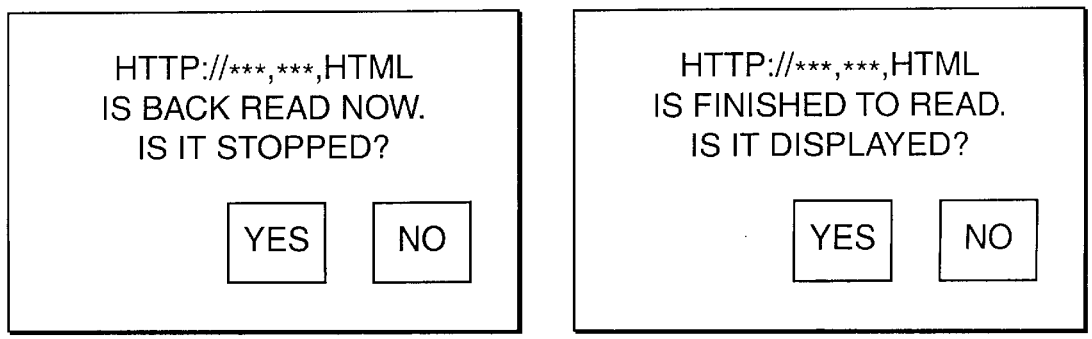
FIG. 24B     FIG. 24C

ORIGINAL HYPER TEXT 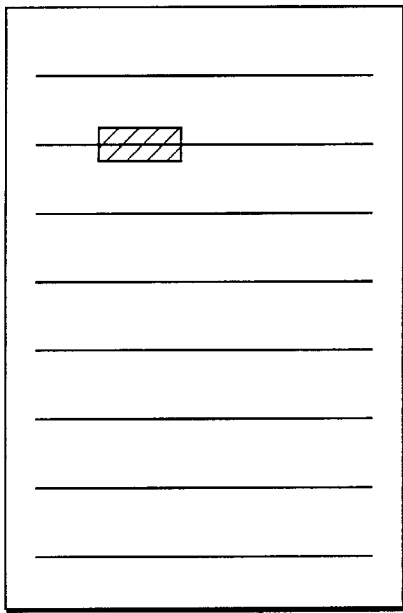
LINKED HYPER TEXT 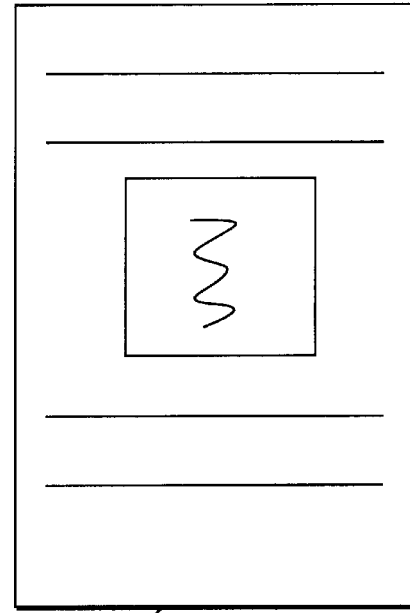
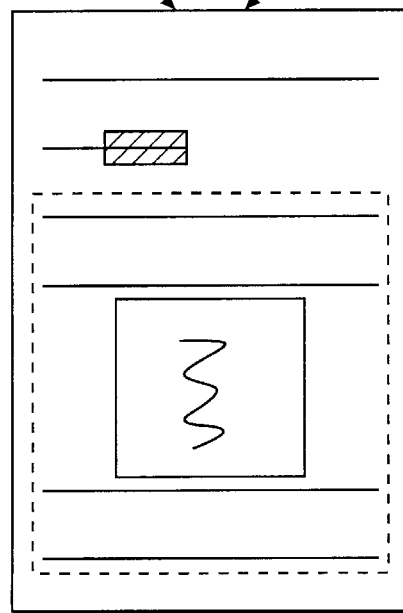
COMPOUND HYPER TEXT
*FIG. 27*

```
<HTML>
<HEAD>
<TITLE>MY HOME PAGE</TITLE>
</HEAD>
<BODY>
<A HREF = "//SERVER B/FILEB.HTML">HTML FILE B</a>   ← - - - - - - - - - - - - - - (1)

• • • • • •

<UPDATECHECK URL="//SERVER B/FILEB.HTML">HTML FILE B</UPDATECHECK>   ← - (2)

• • • • • •

</BODY>
</HTML>
```

FIG. 32

```
<HTML>
<HEAD>
<TITLE>B'S HOME PAGE</TITLE>
</HEAD>
<BODY>
WELCOME TO B' HOME PAGE!
MY NAME IS B.

• • • • • •

</BODY>
</HTML>
```

FIG. 33

```
<HTML>
<HEAD>
<TITLE>B'S HOME PAGE</TITLE>
</HEAD>
<BODY>
WELCOME TO B' HOME PAGE!
I HAVE NEW INFORMATION.

• • • • • •

</BODY>
</HTML>
```

FIG. 34

```
#VRML V1.0 ASCII

SEPARATOR {
    WWWPREREAD {
        NAME "LINKED URL"
        CONE { }
    }
}
```

```
#VRML V1.0 ASCII

SEPARATOR {

MATERIAL {
        EMISSIVECOLOR 0.5 0.5 0.5
    }
    WWWPREREAD {
        NAME "LINKED URL"
        CONE { }
    }
}
```

```
#VRML V1.0 ASCII

SEPARATOR {
   WWWPREREAD {
      NAME "LINKED URL"
      CONE { }
   }

TRANSFORM {
      TRANSLATION  2.0 0.0 0.0
   }
   WWWINLINE {
      NAME = "HTTP://WWW.XXX.YYY/VRML FILE NAME OF THREE-DIMENSIONAL NAME
   }

}
```

INFORMATION PRESENTATION APPARATUS AND METHOD

BACKGROUND OF THE INVENTION

1. Field of the Invention

The present invention relates to an information presentation apparatus and method to effectively present a hyper text or three-dimensional CG (Computer Graphic) in connection with other information.

2. Description of the Related Art

Recently, thanks to the spread of Internet, everyone can access various kinds of information in the world using a personal computer or work station. A browser such as Mosaic can present the information contained in a home page on the WWW (World Wide Web). Most information on the home page is contained in HTML (Hyper Text Markup Language), which presents text, sound, still images and dynamic images. A specific feature of HTML is the hyperlink function which connects the presented information with other information. Using the hyperlink function, if a user indicates or "clicks" on a word on the displayed home page, the user can view a detailed explanation corresponding to that word. To process three-dimensional data, VRML (Virtual Reality Modeling Language) is used. The home page described by VRML presents a virtual space in a three-dimensional CG. VRML also features a hyperlink function of the three-dimensional data which connects a user with other home pages. For example, if an object in the virtual space is "clicked" on by a mouse, a detailed explanation about the object is displayed on the home page. If a door of one room in the virtual space is clicked on, the control of the display is moved to the VRML site which describes the three-dimensional data of the one room. In short, the hyperlink can connect various kinds of home pages in the world through a network.

FIG. 1 is an example of an HTML file of the prior art and FIG. 2 is an example of a VRML file of the prior art. The HTML file contains two-dimensional data such as text and still image, which are displayed as hyper text. The VRML file represents three-dimensional data, which is displayed as a three-dimensional CG. FIG. 3 is a schematic diagram of a three-dimensional CG represented by the VRML file in FIG. 2. In HTML and VRML files, the description includes at least one part linked to another file (another HTML file or VRML file). In FIG. 1, the address linked to other file is described in 8 line as a URL (Uniform Resource Locator). If the HTML file in FIG. 1 is displayed as hyper text, the text "linked part" (Line 9) is displayed in a corresponding position of the description. When the user indicates the position of the "linked part" on display, the information of the linked URL is read from a file (another file). If the VRML file in FIG. 2 is displayed as a three-dimensional figure, a cone as a linked part is displayed as shown in FIG. 3. When the user clicks on the part of the cone on display, the information of the linked URL is read from the file in same way as shown in FIG. 1.

In related art HTML and VRML, if the user clicks on the linked part to display the related information, the computer connects to the linked address in the file. However, in the case where the computer is connected to the file over a network, a series of sequential transmissions is required to transfer the accessed information from the file to the computer. When large quantities of information are transmitted from the file, a longer series of sequential transmissions is required.

In the prior art, it is not possible for the user to view a summary of the related information before the related information is transmitted from the file to the computer. It is also not possible to create a summary of the related information or previously store the summary corresponding to the related information. It is not possible for the user to ascertain the data transmission rate or the quantity of data to be transferred before the related information is actually transmitted from the file. It is not possible for the user to select the kind of data to read from the file. It is not possible to read back the related information from the file while the original information is on display. Finally, it is not possible to combine the related information in the original information after the relative information is read from the file.

In short, in the prior art, it is not possible for the user to effectively present the related information. The information presentation apparatus of the prior art is thus unfriendly to the user.

SUMMARY OF THE INVENTION

It is an object of the present invention to provide an information presentation apparatus and method for a user to effectively present and create a summary of the first information, N.1. the information available through the hypertext link.

According to the present invention, there is provided an information presentation apparatus, comprising: a memory means for storing first information including at least one part corresponding to second information, and a summary of the second information; display means for displaying the first information stored in said memory means; an indication means for indicating the part corresponding to the second information in the first information displayed by said display means; wherein said display means displays the summary of the second information read from said memory means.

Further, in accordance with the present invention, there is provided an information presentation apparatus, comprising: a memory means for storing the first information including at least one part corresponding to the second information; a display means for displaying the first information; an indication means for indicating the part of the first information displayed by said display means to display the second information; a read means for reading the second information from a file in response to the indication of the part; and a summary creation means for extracting a portion of the second information as the summary to store in said memory means.

Further, in accordance with the present invention, there is provided an information presentation apparatus, comprising: a memory means for storing the first information including at least one part corresponding to the second information; a display means for displaying the first information; an indication means for indicating the part of the first information displayed by said display means to read the second information from a file; an inquiry means for asking the file the status of the attempt to access the second information; wherein said display means displays the status inquired of said inquiry means and displays an icon to determine whether the second information is displayed or not.

Further, in accordance with the present invention, there is provided an information presentation apparatus, comprising: a memory means for storing the first information including at least one part corresponding to the second information; a display means for displaying the first information; an indication means for indicating the part of the first information displayed by said display means; wherein said display means displays an icon to select a data category of the second information according to a data format described in the part of the first information; and a read means for reading the second information corresponding to the data category indicated by said indication means from a file.

Further, in accordance with the present invention, there is provided an information presentation apparatus, comprising: a memory means for storing the first information, including at least one part corresponding to second information; a display means for displaying the first information; an indication means for indicating the part of the first information displayed by said display means; a decision means for deciding whether the second information is already stored in said memory means or not; wherein said display means displays an icon to determine whether reading back of the second information is executed or not if the second information is not stored in said memory means; and a read means for reading the second information without displaying from a file if the reading back is indicated by said indication means.

Further, in accordance with the present invention, there is provided an information presentation apparatus, comprising; a memory means for storing the first information including at least one part corresponding to the second information stored in a file a display means for displaying the first information; an indication means for indicating the part of the first information displayed by said display means; a read means for reading the second information from the file in response to the indication of the part; a composition means for replacing the indicated part of the first information by the second information to form new information wherein said display means displays the new information instead of the first information.

BRIEF DESCRIPTION OF THE DRAWINGS

FIG. 1 is an example of an HTML file of the related art.

FIG. 2 is an example of a VRML file of the related art.

FIG. 23 is an example of display for choosing a reading back of linked information according to the fifth embodiment.

FIGS. 24A–24C are examples of a display to inform user of the reading back and completion of the reading back.

FIG. 27 is a schematic diagram of the composition of hypertext.

FIG. 32 is an example of an HTML file linked to another file.

FIG. 33 is an example of an old HTML file linked.

FIG. 34 is an example of new HTML file linked.

DETAILED DESCRIPTION OF THE PREFERRED EMBODIMENTS

Figure 3:
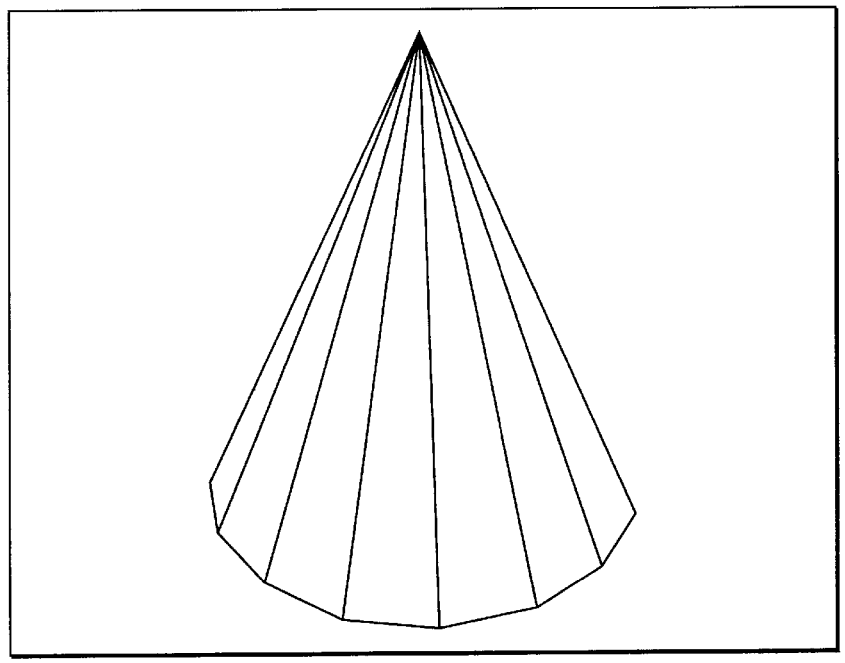
FIG. 3 is an example of a three-dimensional CG of a VRML file.
Figure 4:
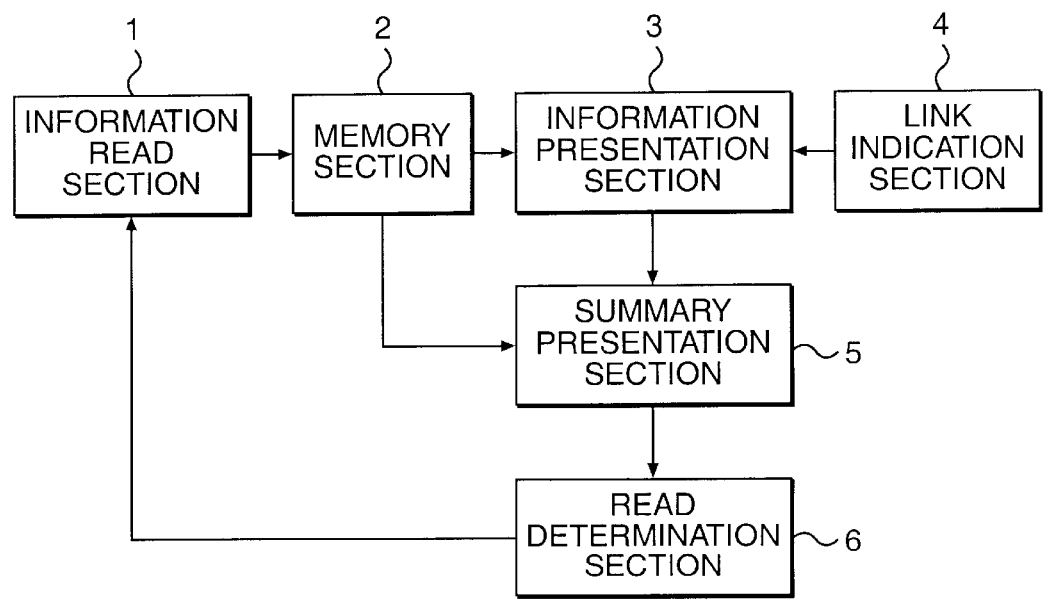
FIG. 4 is a block diagram of the information presentation apparatus according to a first embodiment of the present invention.
Figure 5:
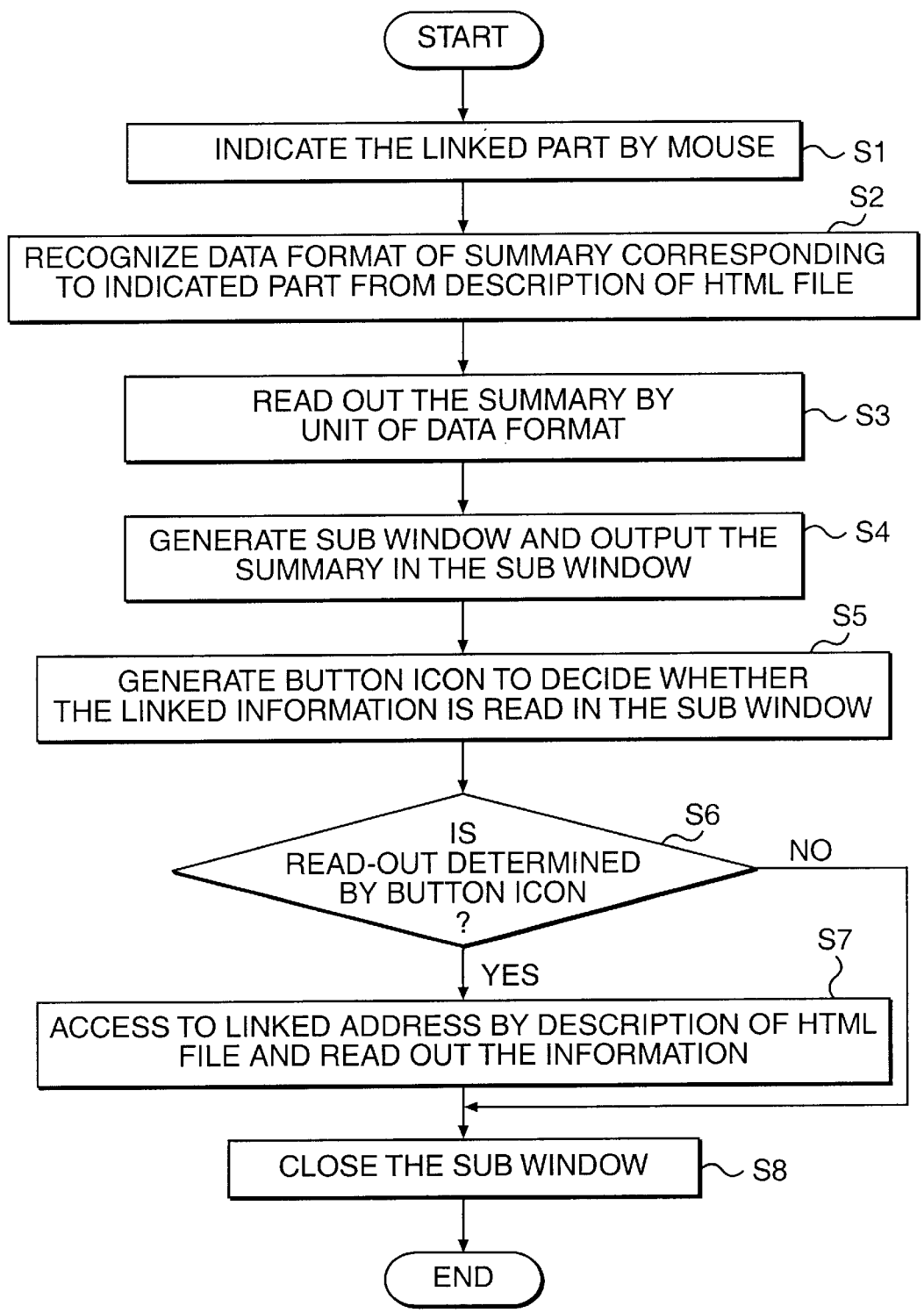
FIG. 5 is a flow chart depicting the processing of the information presentation method according to the first embodiment of the present invention.

The embodiments of the present invention are described below with reference to the drawings. FIG. 4 is a block diagram of the information presentation apparatus according to a first embodiment of the present invention. FIG. 5 is a flow chart depicting the processing of the information presentation method according to the first embodiment of the present invention. In this embodiment, the summary of the related information is displayed before the related information is accessed from the file. Therefore, as a means to read the summary, the extended description in the specification of the HTML and VRML is used. In the following explanation, assume that the file to be read is an HTML file.

The information presentation apparatus of the first embodiment includes an information read section 1, a memory section 2, an information presentation section 3, a link indication section 4, a summary presentation section 5, and a read determinaton section 6. The information read section 1 accesses to a server indicated by the user over the network and reads out an HTML file and VRML file. The memory section 2 stores the HTML file, VRML file, and summary file read by the information read section 1. The information presentation section 3 interprets the description of the HTML file and the VRML file stored in the memory section 2 and displays the content of the description as hypertext or a three-dimensional CG. In addition to displaying the hypertext or three-dimensional CG, the information presentation section 3 interprets the extended description of the summary. For example, with reference to the linked part in the HTML file, the part is displayed to contrast with the non-linked part, as a colored part or underlined part. In the same manner, in order to contrast with the part corresponding to the summary, this part is displayed by a color different from the other part. The link indication section 4 is used for indicating the linked part in the hypertext or three-dimensional CG displayed by the information presentation section 3. For example, when the user clicks on the linked part using the left button of the mouse, the linked part is indicated. The summary presentation section 5 reads out the summary from the memory section 2 according to the indication of the link indication section 4 and presents the summary. For example, the summary presentation section 5 activates a presentation-application for one of the data format, text, still image, dynamic image, or three-dimensional CG to present. The presentation-application presents the summary in a window separate from the information presentation section 3 or in the display area of the information presentation area. The read determination section 6 is used for determining whether to access the linked information to read. For example, a button icon to input using the mouse is prepared on the summary presentation section 5 as an interface to determine whether to read the information.

Figures 6, 7:
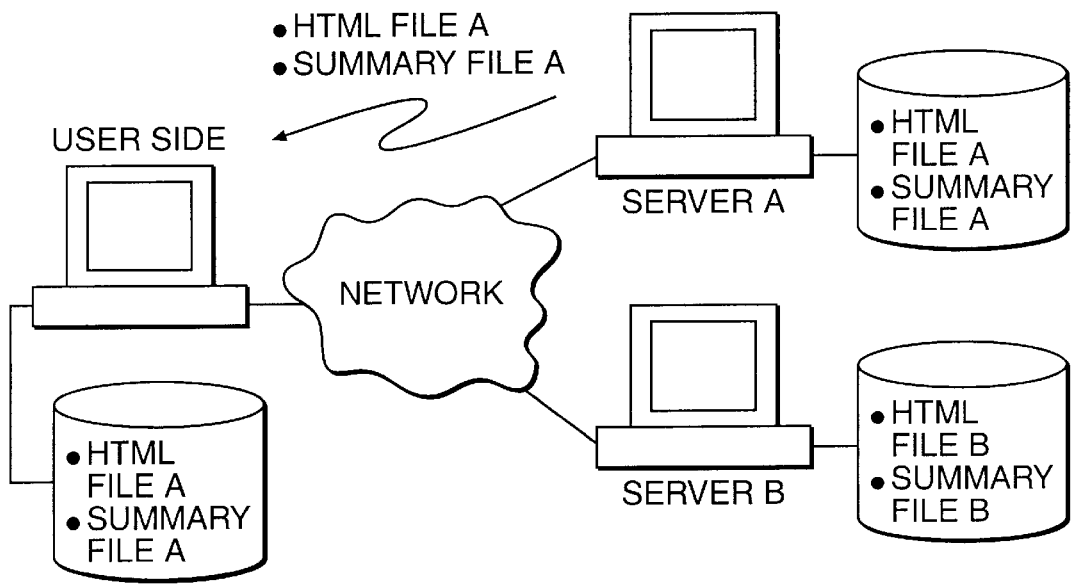
FIG. 6 is a schematic diagram of the reading of an HTML file and summary file over a network.
FIG. 7 is an example of an extended HTML file according to the present invention.

FIG. 6 is a schematic diagram of the network system to read out HTML file A and summary file A. In this example, the summary is stored in the summary file A. A creator of the HTML file A previously prepares the summary file A to store the summary corresponding to the linked part of the HTML file A. In short, if a different HTML FILE B of a different server B is linked to HTML file A, the summary of HTML file B is stored in the summary file A. The user side reads out the HTML file A and the summary file A through the server A. The HTML file A and the summary file A are stored in the memory section 4.

FIG. 7 is a schematic diagram of the content of an HTML file. In addition to <A HREF="http: // HTML FILE B> corresponding to the linked part in HTML file A, <INFO FILE="SUMMARY FILE A"> as an extended specification of the HTML to indicate the summary file A is described. The extended specification <INFO FILE . . . > includes a function to allow that when the word "PATENT" is indicated, the summary file A is read out before the HTML file B linked by description <A HREF . . . > and displayed in the summary presentation section 5. In short, if the description <INFO FILE . . . > is inserted before the description <A HREF . . . >, a function of <INFO FILE . . . > is executed in advance of the function <A HREF . . . >. Therefore, the reading and presentation of the summary is executed before reading out HTML file B. For example, as the summary of HTML file B to store the patent, the summary file A to store the summary of patent is read out.

Figure 8:
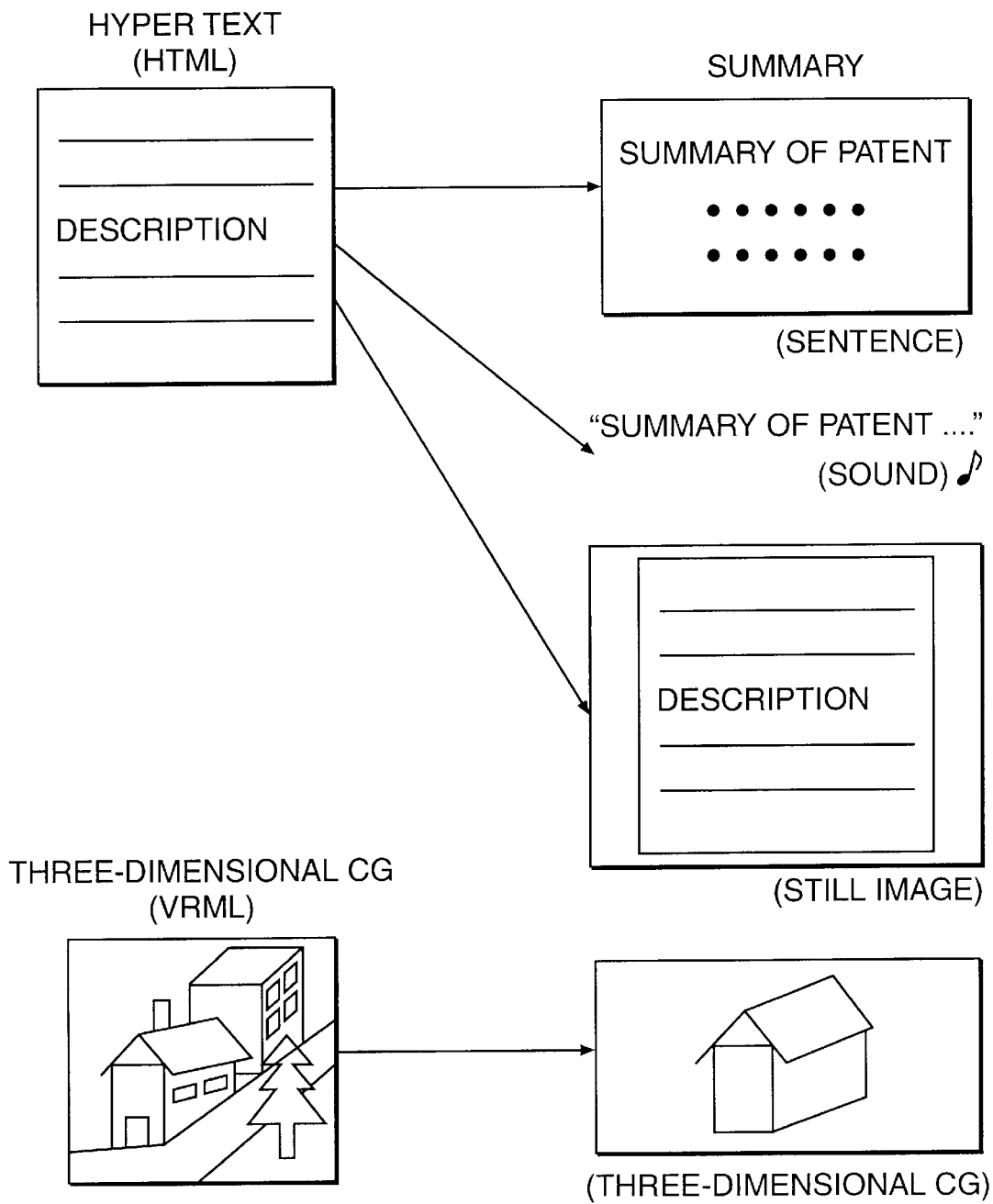
FIG. 8 is an example of the summary information.

FIG. 8 is a schematic diagram of an example of displaying the summary file. The summary file is comprised of one each of a text, still image, dynamic image, sound, and three-dimensional CG. In general, the content of the summary is the text data. However, a narration (sound) of the summary, a reduced still image of the linked home page, or a part of the three-dimensional CG as a three-dimensional object described in the VRML file may be used. Accordingly, when the user indicates the linked part in the displayed HTML file by mouse (SI in FIG. 5), a data format of the summary corresponding to the indicated part is recognized from the description of the HTML file (S2 in FIG. 5). The summary is read out from the memory section 2 by unit of data format (S3 in FIG. 5).

Figures 9, 10:
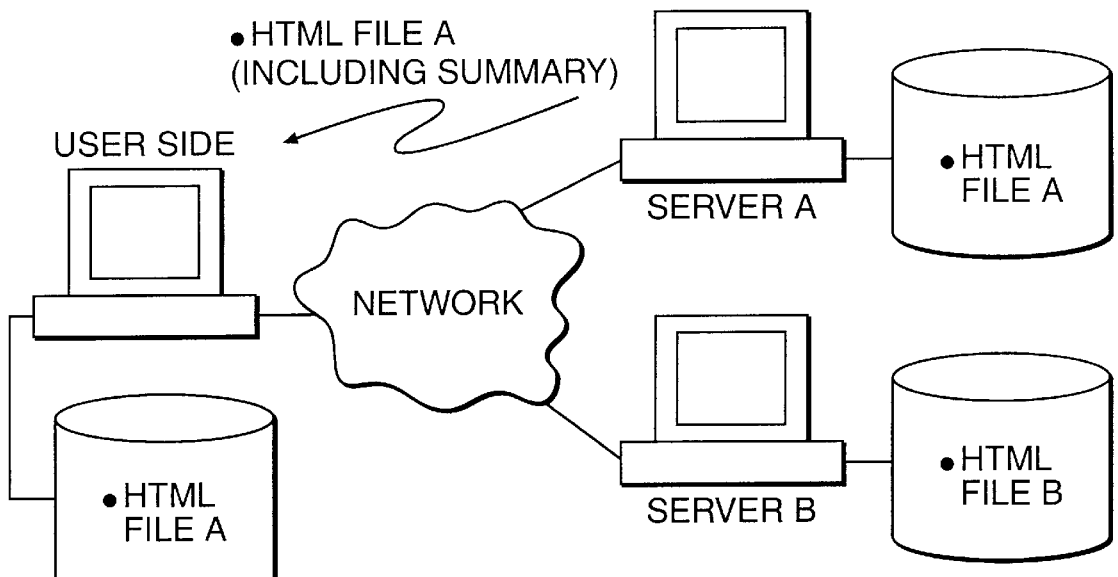
FIG. 9 is a schematic diagram of reading an HTML file, including the summary, over a network.
FIG. 10 is an example of an extended HTML file.

FIG. 9 is a schematic diagram of a network system to read out HTML file A including the summary. In this case, the summary is stored in the HTML file as text data. FIG. 10 is a schematic diagram of an HTML file in which the summary is directly described. In FIG. 10, <INFO DIRECT > "SUMMARY . . . " and </INFO > are added to the linked part in the HTML file as an extended specification. In this case, the text following <INFO DIRECT > is the summary. In case a plurality of linked parts is included in the HTML file, a plurality of summaries is collectively described in one part of the HTML file. In order to correspond the linked part to the summary, <INFO MYREF="#1">, <INFO NAME "1"> and SUMMARY A </ INFO > are described as the extended specification. In this case, if the word "PATENT A" is indicated, the text "SUMMARY A" is presented before the linked information (HTML file B) is read out. In short, <INFO NAME="1" is described as hidden information when the HTML file is displayed and presented when it is indicated.

Figure 11A:
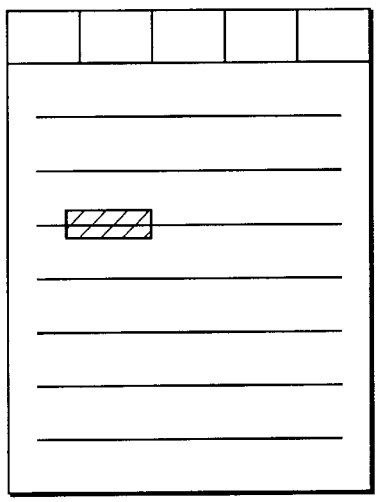
FIGS. 11A–11E show examples of a display for presenting the summary and icon for choosing whether to read or closre the summary.
Figure 11B:
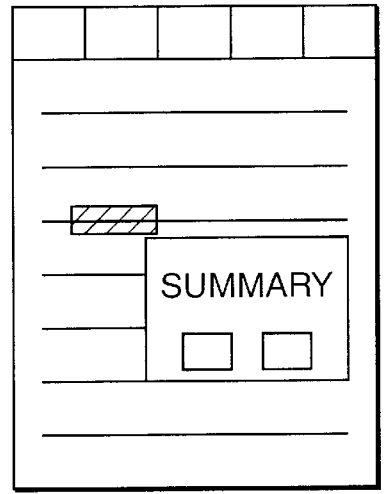
Figure 11C:
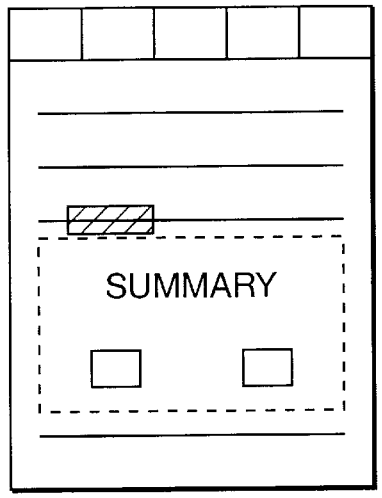
Figure 11D:
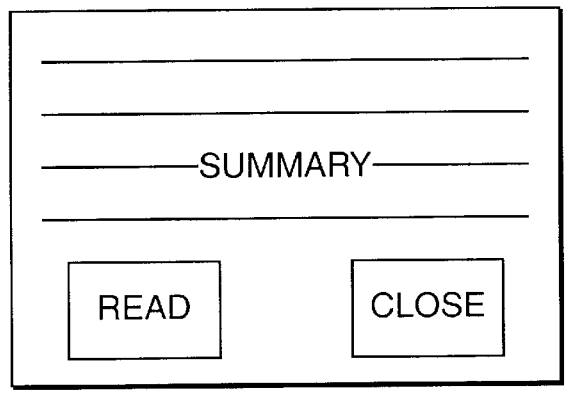
Figure 11E:
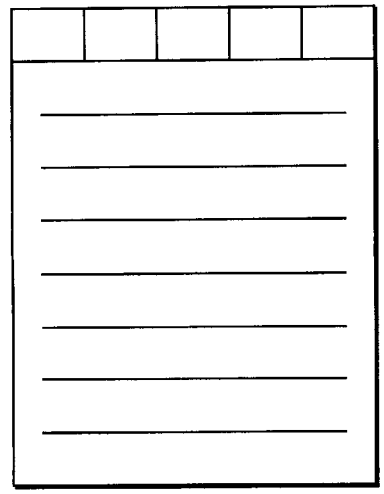

FIGS. 11A–11E show schematic diagrams of a series of displays beginning with the indication of the linked part in hypertext (FIG. 11A) to displaying the linked hyper text (FIG. 11E). FIG. 11A shows the display of the original hypertext. The oblique-lined rectangle is a linked part corresponding to the other hypertext and the summary. FIG. 11B shows the display of the summary in subwindow (S4 in FIG. 5) when the linked part is indicated by the link indication section 4. FIG. 11C shows the display of the summary in a part of the information presentation area. FIG. 11D shows the display of the summary presentation section 5. In addition to the summary, a button icon (READ)-used to determine whether the linked information (other file) is read out- is displayed (S5 in FIG. 5) as well as a button icon (CLOSE) to close the subwindow. The function of the button icon is executed by clicking the mouse. FIG. 11E shows a display of the linked information (other HTML file) that results by selecting the "READ" button (S6,S7 in FIG. 5).

Figure 12:
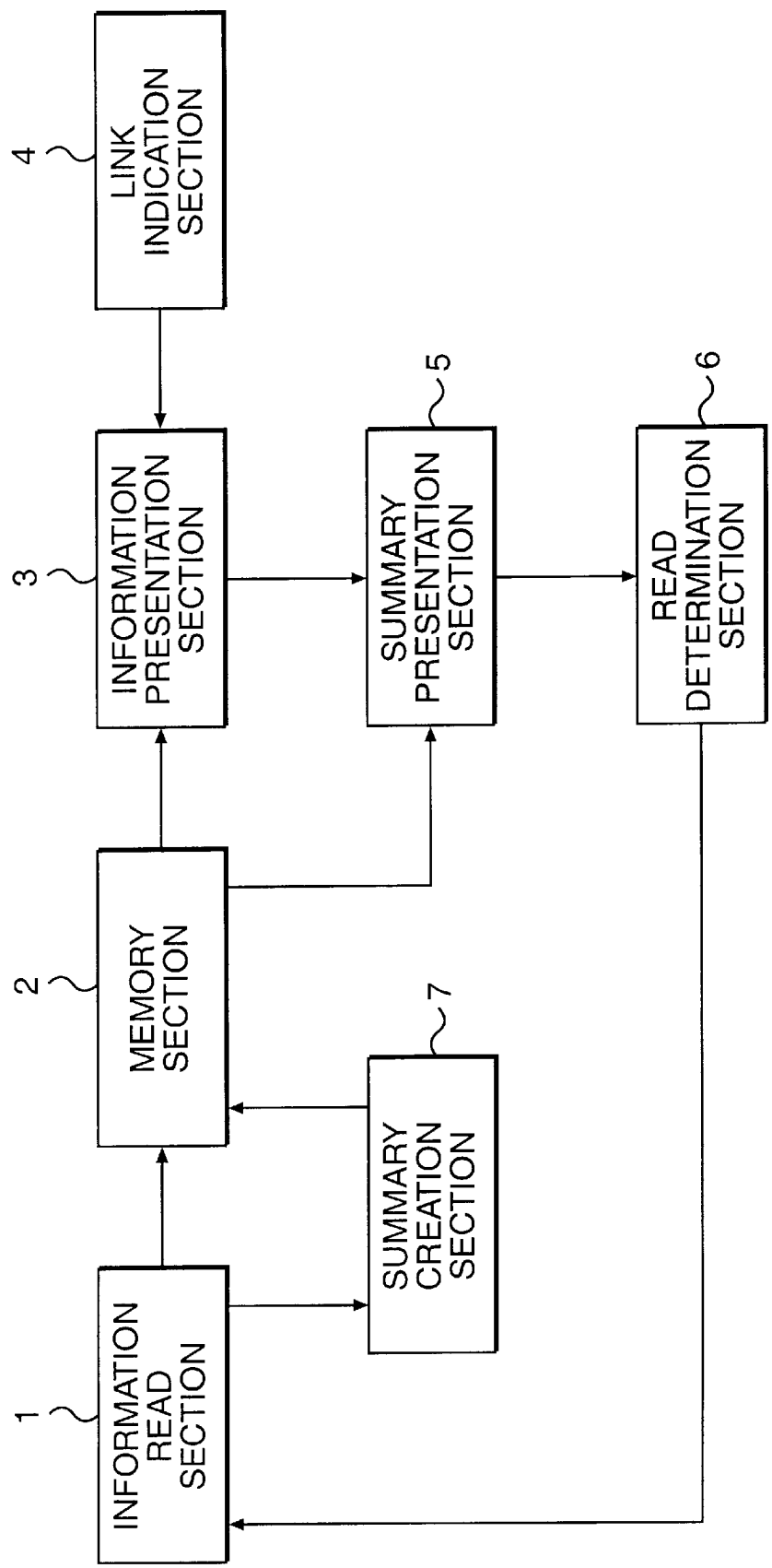
FIG. 12 is a block diagram of the information presentation apparatus according to a second embodiment of the present invention.
Figure 13:
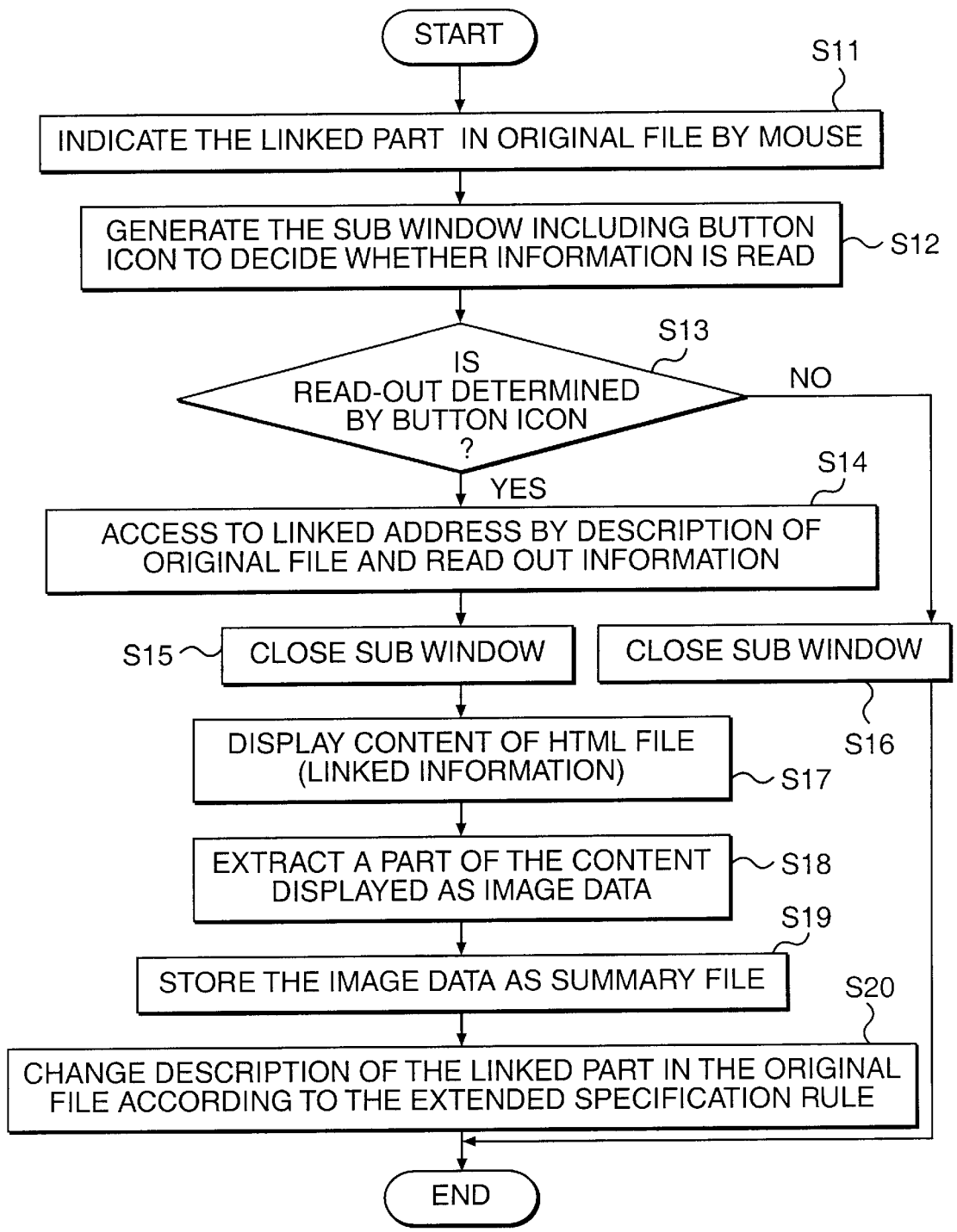
FIG. 13 is a flow chart depicting the processing of the information presentation method according to the second embodiment of the present invention.

FIG. 12 is a block diagram of the information presentation apparatus according to the second embodiment of the present invention. FIG. 13 is a flow chart of the processing of the information presentation method according to the second embodiment. In the information presentation apparatus in FIG. 12, the summary creation section 7 differs in comparison with that of the first embodiment. The summary creation section 7 creates the summary using the file read by the information read section 1. For example, a plurality of sentences is extracted from the beginning part of an HTML file and stored in the memory section 2 as the summary file. The beginning part of hypertext of the HTML file is extracted as a still image and stored in the memory section 2 as the summary file. In the case of a VRML file, a three-dimensional CG scene is extracted as still image and stored in the memory section 2 as the summary file of the still image.

Figure 14A:
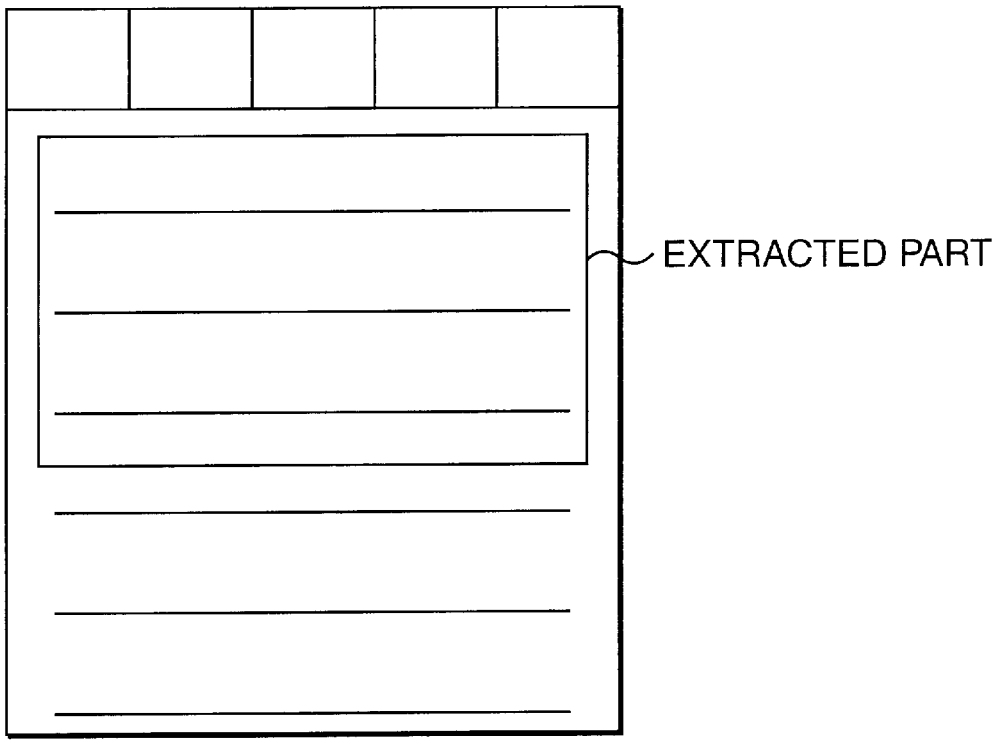
FIGS. 14A and 14B are schematic diagrams showing the creation of the summary of the still image.
Figure 14B:
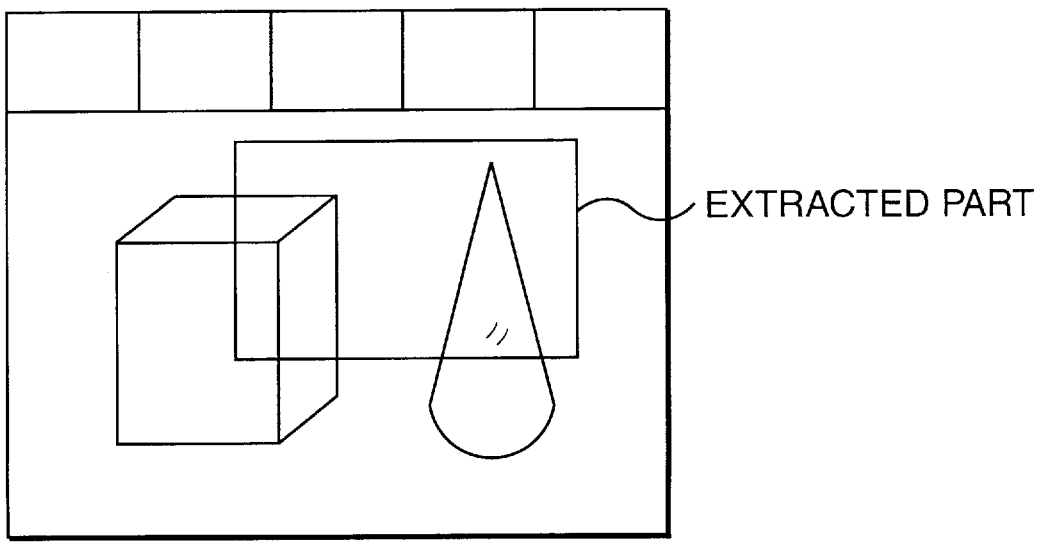

In case that the text in HTML file is extracted as the summary, the summary creation section 7 extracts a tag part such as a title from the HTML file to automatically create the summary file. In case that the still image, such as the hypertext version of the three-dimensional CG scene, is extracted as the summary file, the content of the HTML file is first displayed (S17 in FIG. 13). Then, a part of the displayed contents (hypertext on the three-dimensional image) is extracted (S18 in FIG. 13). FIG. 14A shows the display situation of the extraction from the hypertext, and FIG. 14B shows the display situation of the extraction from the three-dimensional CG scene. In order to store the extracted part as a summary file, the summary creation section 7 changes the description of the linked part in the original file according to the extended specification rule (S19,S20 in FIG. 13). Therefore, even if the linked part in the original file does not link to the summary, the summary presentation section 7 accesses the linked information and creates a summary using a description of the linked part in the original file. During the next access, the user can view the summary before reading out the linked information.

Figure 15:
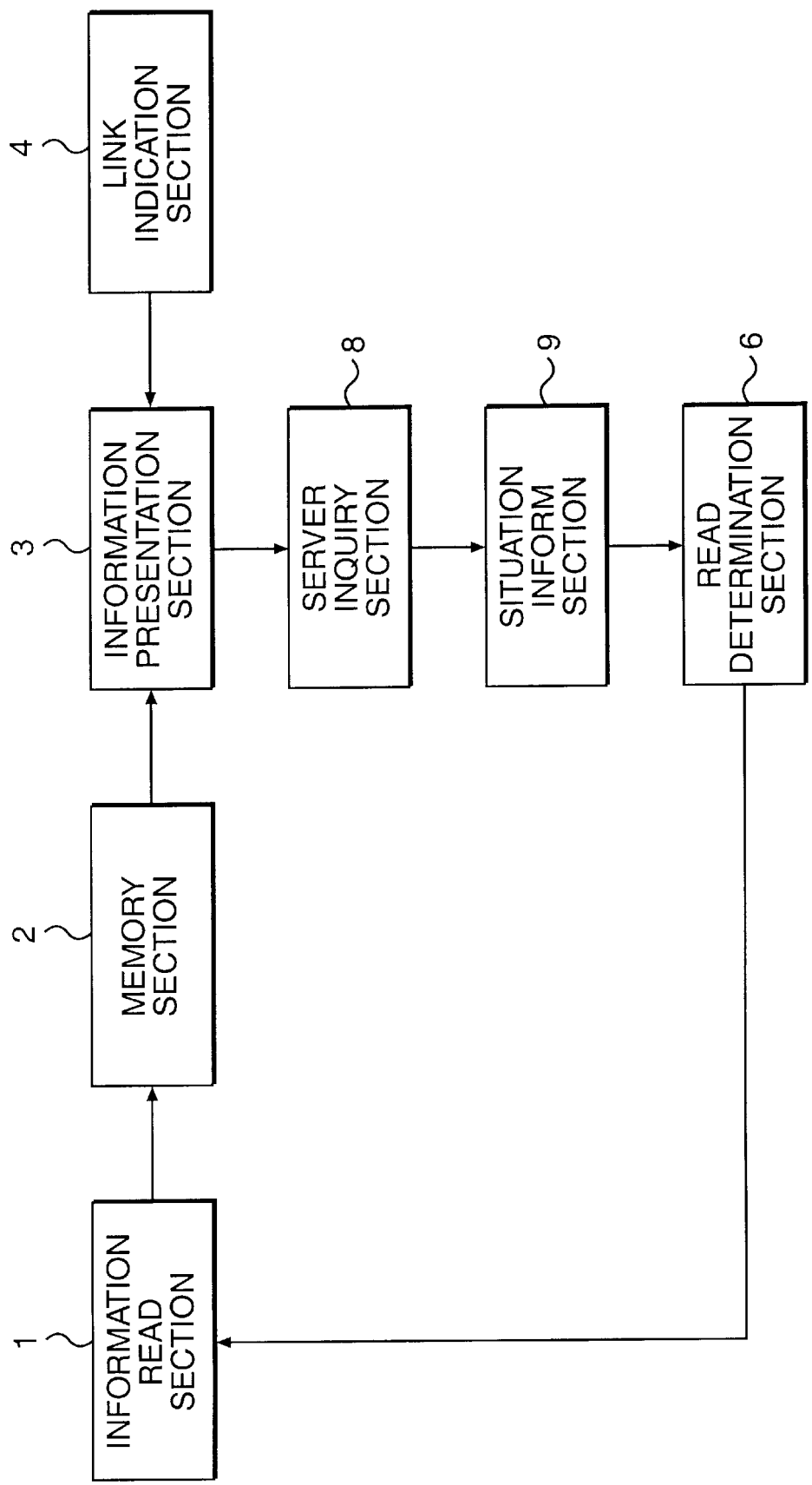
FIG. 15 is a block diagram of the information presentation apparatus according to a third embodiment of the present invention.
Figure 16:
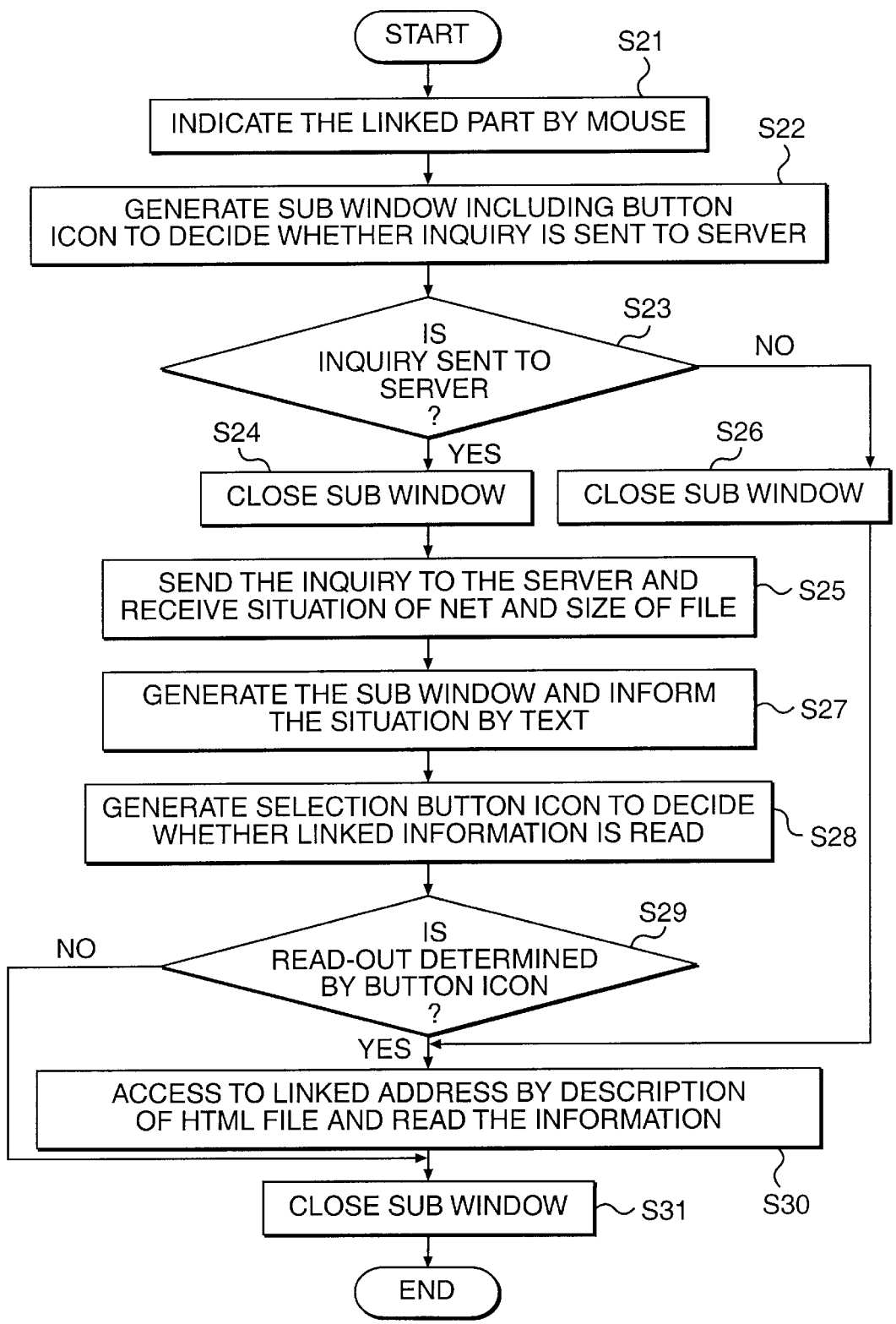
FIG. 16 is a flow chart depicting the processing of the information presentation method according to the third embodiment of the present invention.

FIG. 15 is a block diagram of the information presentation aparatus according to the third embodiment of the present invention. FIG. 16 is a flow chart depicting the processing of the information presentation method according to the third embodiment. The server inquiry section 8 and a situation inform section 9 do not appear in the first and second embodiment. The server inquiry section 8 accesses the server of the linked file and examines the status of the server and quantity of linked information before the linked information is read out. The situation inform section 9 informs the situation of the linked file to the user.

Figure 17A:
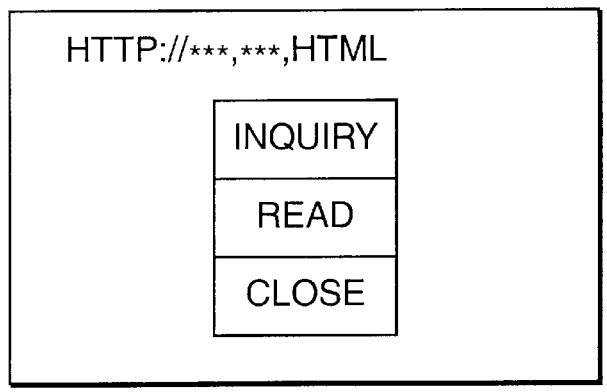
FIGS. 17A–17C show examples of a display of an inquiry, the status information, and the decision to read according to the third embodiment.
Figure 17B:
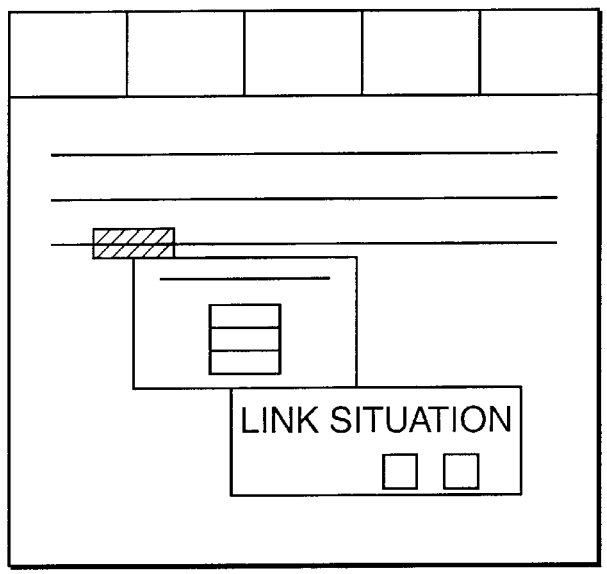
Figure 17C:
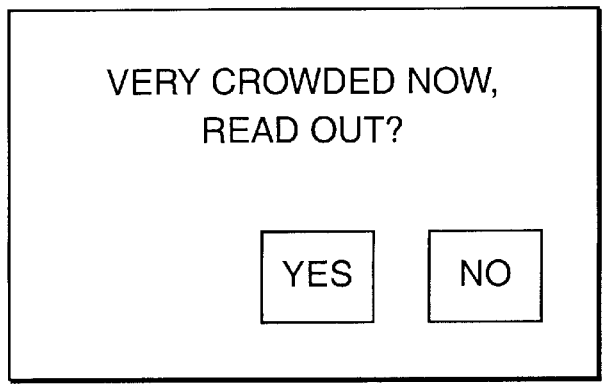

FIGS. 17A–17C provide examples of displays showing inquiry to the server and a response to that inquiry. FIG. 17A shows a subwindow used to decide whether the inquiry is sent to the server. The subwindow is opened in the display when the linked part is indicated (S21,S22 in FIG. 16). As shown in FIG. 17A, three button icons "INQUIRY", "READ", "CLOSE" are displayed in the sub window. If the icon "READ" is selected, the linked information is read out from the file immediately (S23,S26,S30 in FIG. 16). FIG. 17B shows a display of the subwindow informing the user of the server situation when the icon "INQUIRY" is selected (S25,S27 in FIG. 16). FIG. 17C shows a display situation of content to inform the server situation. In this case, button icons used to decide whether or not to read out the linked information are displayed with the server situation (S28 in FIG. 16). If the icon "YES" is selected by the user, the linked information is accessed to the file and read out (S29,S30 in FIG. 16).

Figure 18:
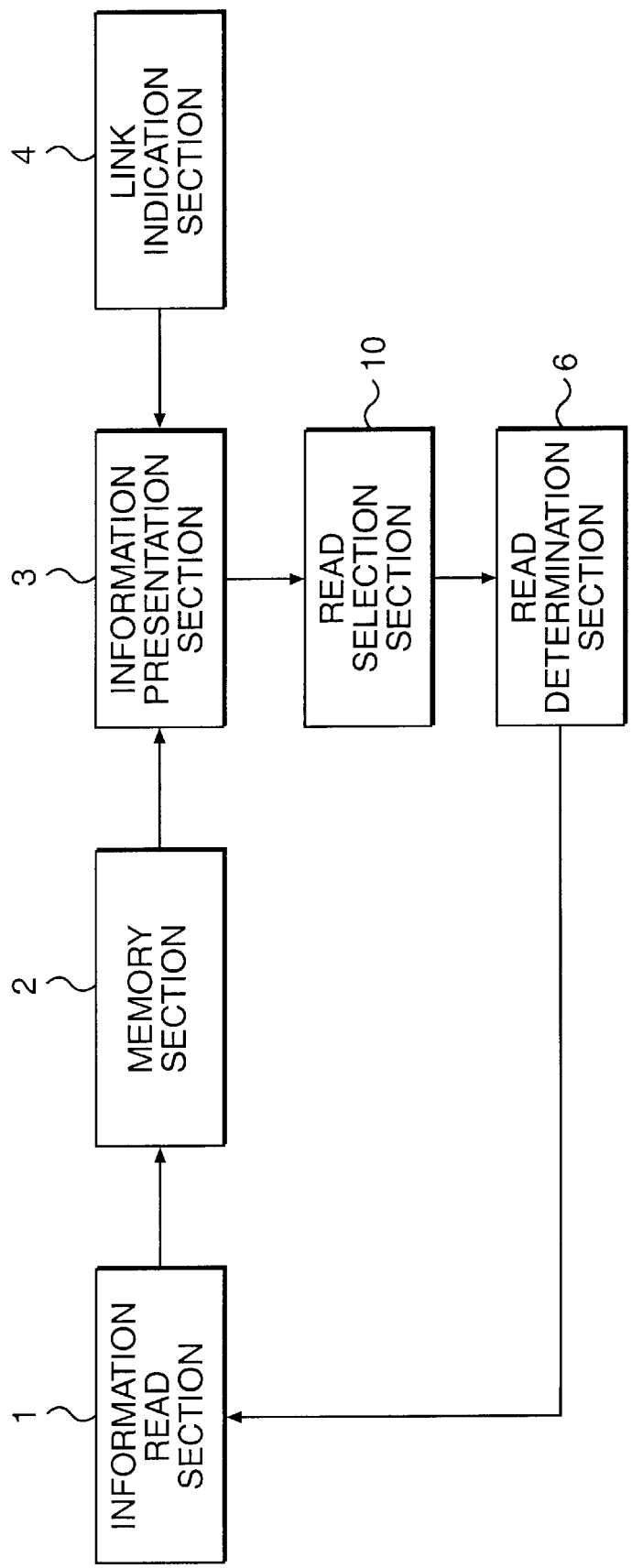
FIG. 18 is a block diagram of the information presentation apparatus according to a fourth embodiment of the present invention.
Figure 19:
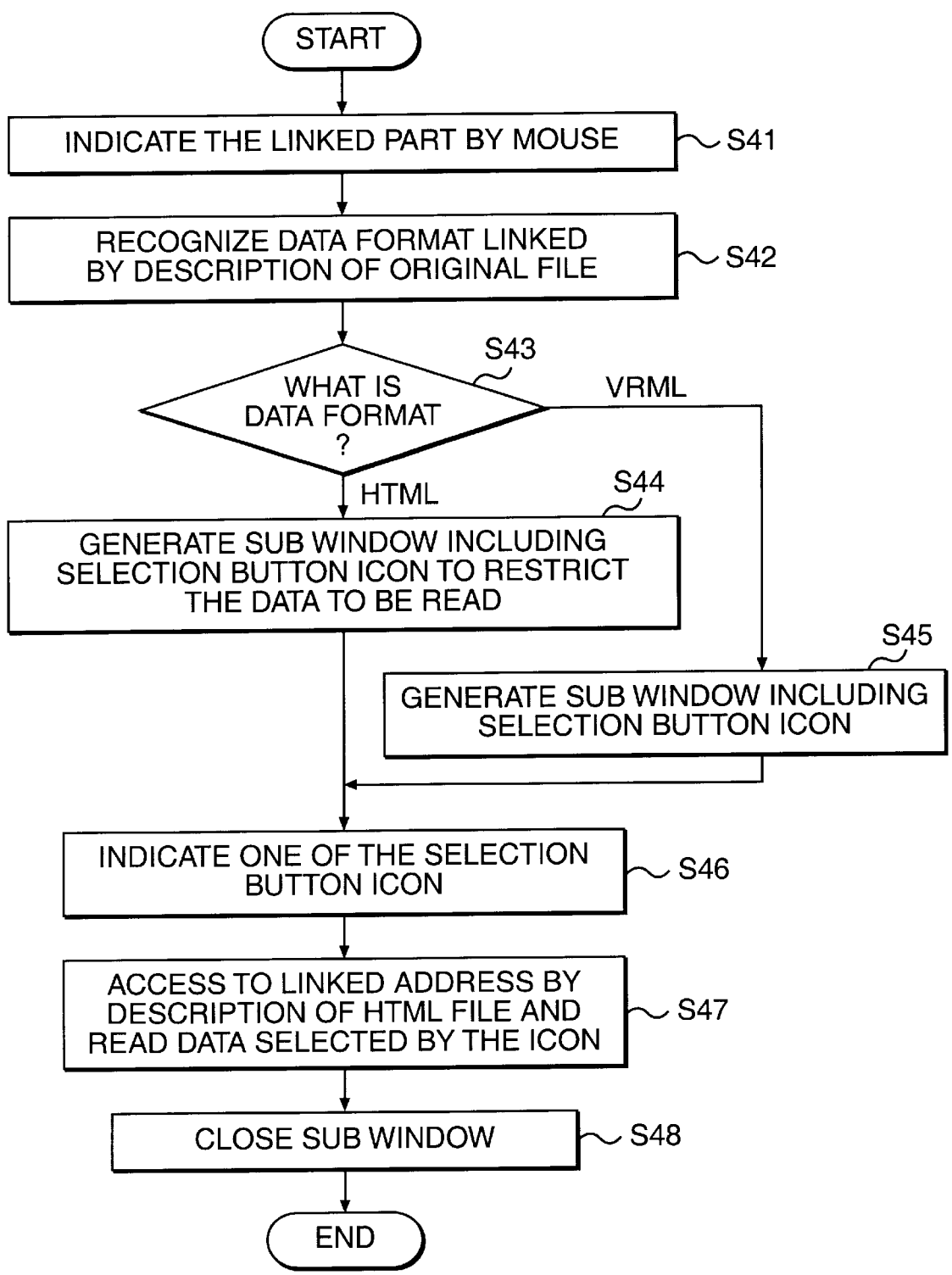
FIG. 19 is a flow chart depicting the prosessing of the information presentation method according to the fourth embodiment of the present invention.
Figure 20A:
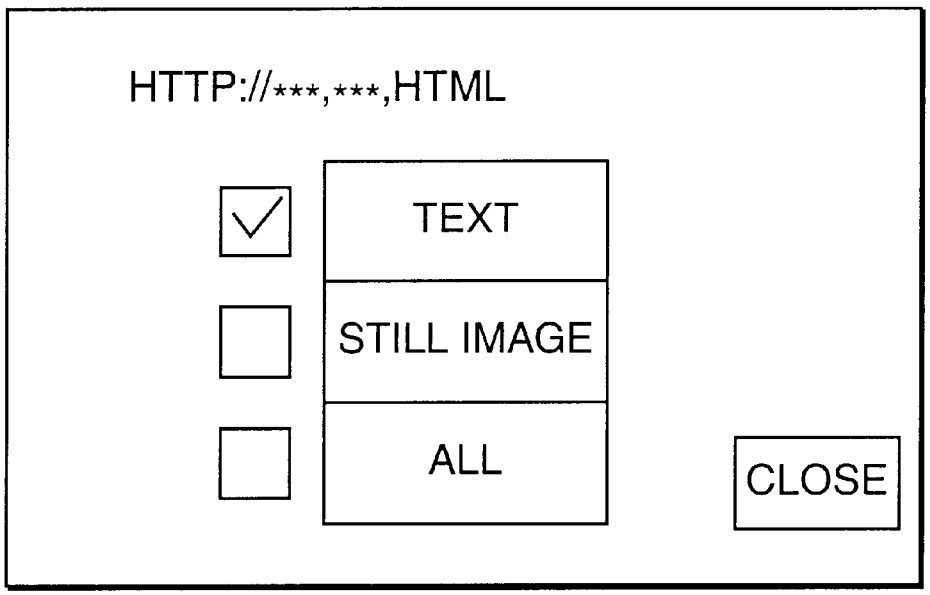
FIGS. 20A and 20B show examples of display of the selection for reading according to the fourth embodiment.
Figure 20B:
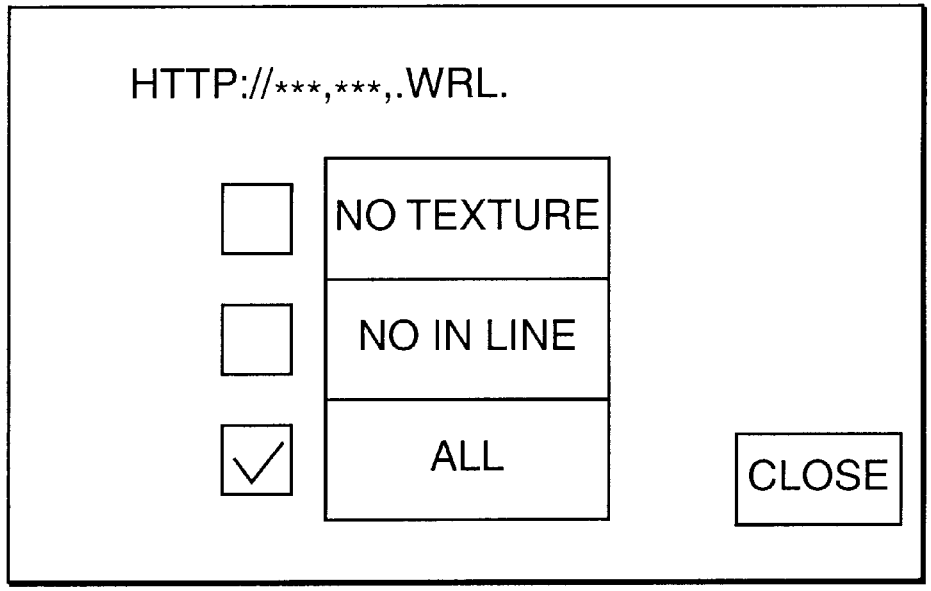

FIG. 18 is a block diagram of the information presentation apparatus according to the fourth embodiment of the present invention. FIG. 19 is a flow chart depicting the processing of the information presentation method according to the fourth embodiment. The read selection section 10 distinguishes this embodiment from the first embodiment. The read selection section 10 selects a part of the linked information to read out. FIGS. 20A and 20B show the display of the interface to select a part of the linked information. If the linked part in a displayed file is indicated, the information corresponding to the linked part is determined to be in an HTML or VRML format according to the description of the original file (S41,S42,S43 in FIG. 19). FIG. 20A shows the display used to indicate that the data format to read out is an HTML file. In this manner, the sub window to select data format to read out is displayed (S44 in FIG. 19). The three button icons "TEXT", "STILL IMAGE", "ALL" are displayed in the sub window. If the icon "TEXT" is selected, the text data without a still image is read out (S46,S47 in FIG. 19). FIG. 20B shows a display used to indicate that the data format to read out is a VRML file representing a three-dimensional CG. The three button icons-"NO TEXTURE" "NO INLINE" "ALL"-are displayed in the subwindow (S45 in FIG. 19). If the icon "NO TEXTURE" is selected, polygon data without texture data as the linked information is read out. If the icon "NO INLINE" is selected, a function to read a second VRML file from the present VRML file is omitted. In this way, the read selection section 10 restricts the quantity of data to read out.

Figure 21:
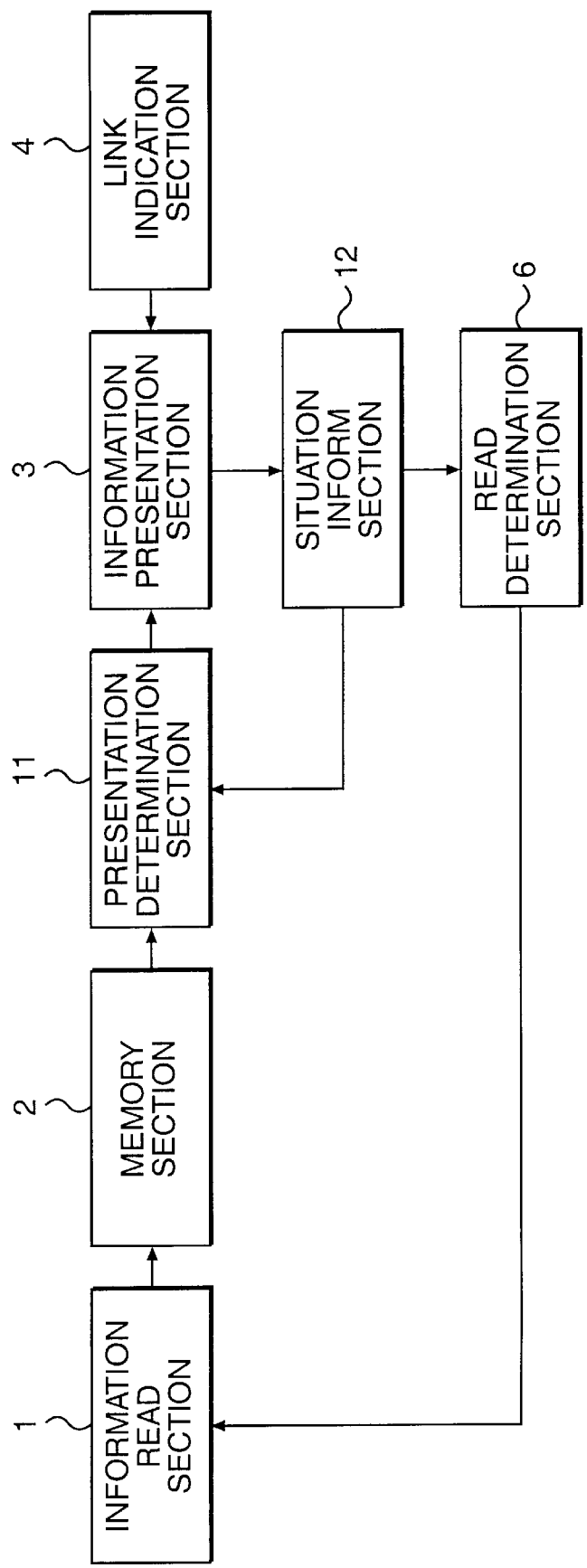
FIG. 21 is a block diagram of the information presentation apparatus according to a fifth embodiment of the present invention.
Figure 22:
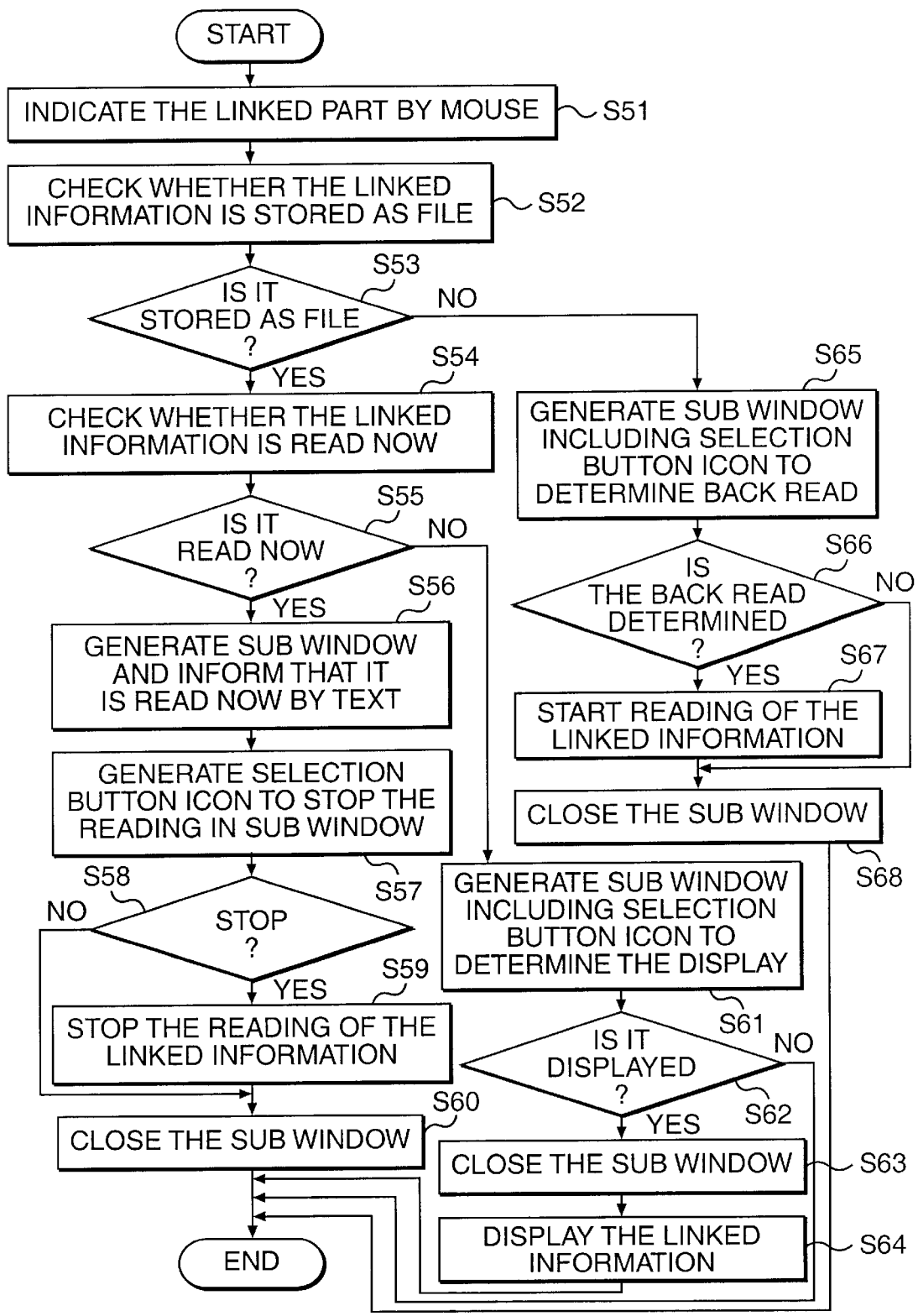
FIG. 22 is a flow chart depicting the processing of the information presentation method according to the fifth embodiment of the present invention.

FIG. 21 is a block diagram of the information presentation apparatus according to the fifth embodiment of the present invention. FIG. 22 is a flow chart depicting the processing of the information presentation method according to the fifth embodiment. In the information presentation apparatus of the fifth embodiment, a presentation determination section 11 and a situation inform section 12 distinguish this embodiment from the first embodiment. The situation inform section 12 informs the user of one of the following three situations of linked information when the linked part is indicated by mouse (S51,S52 in FIG. 22). The first situation is that the linked information is already stored in the memory section 2. The second situation is that the linked information is not stored in the memory section 2. The third situation is that the linked information is currently reading out of the file to the memory section 2 (S53,S54,S55 in FIG. 22). The presentation determination section 11 is used to decide whether the linked information is presented in the first and third situations. In the first situation, a subwindow that includes a selection button icon is displayed (S61 in FIG.

22). The button icon is used to determine whether the linked information is displayed. If the user selects the button icon, the subwindow is closed and the linked information is displayed (S62,S63,S64 in FIG. 22). In the third situation, a subwindow is generated in the display and the text comment "IT IS READ NOW" is displayed in the subwindow (S56 in FIG.22). The selection button icon used to decide whether the reading is stopped and is displayed in the subwindow in addition to the text comment (S58 in FIG. 22). If the user selects the button icon to stop the reading, the reading of the linked information is stopped and the subwindow is closed (S58,S59,S60in Fig,22). In the second situation, the subwindow including the selection button icon is generated in the display. As shown in FIG. 23, the two botton icons "BACK READ " "FRONT READ" are displayed (S65 in FIG. 22). If the button icon "BACK READ" is selected, the linked information is reading out from the file (S66,S67, in FIG. 23). As the linked information is read, the original hypertext remains displayed (S68 in FIG. 22). When the reading of the linked information is completed, the user is so informed. The linked information is stored in the memory section 2. If the button icon "FRONT READ" is selected, the original hypertext is erased from the display and the linked information is orderly displayed as it is read out.

FIGS. 24A–24C show a series of display situation in the case of the back read. FIG. 24A shows the display of the original hypertext. It is assumed that the linked information corresponding to the oblique line part is back read. In order to discriminate the part of back read, the color of the part changes or the part turns on and off. FIG. 24B shows a display of the window to inform a situation of the back read. In this case, the back reading of the linked information is not completed. Therefore, the button icons "YES" and "NO"— to select the stop or the continuation of the back reading— are displayed. FIG. 24C shows a display of the window that informs the user that the back reading of the linked information is completed. Therefore, the button icons "YES" and "NO" used to decide whether the linked information is displayed is included in the window.

Figure 25:
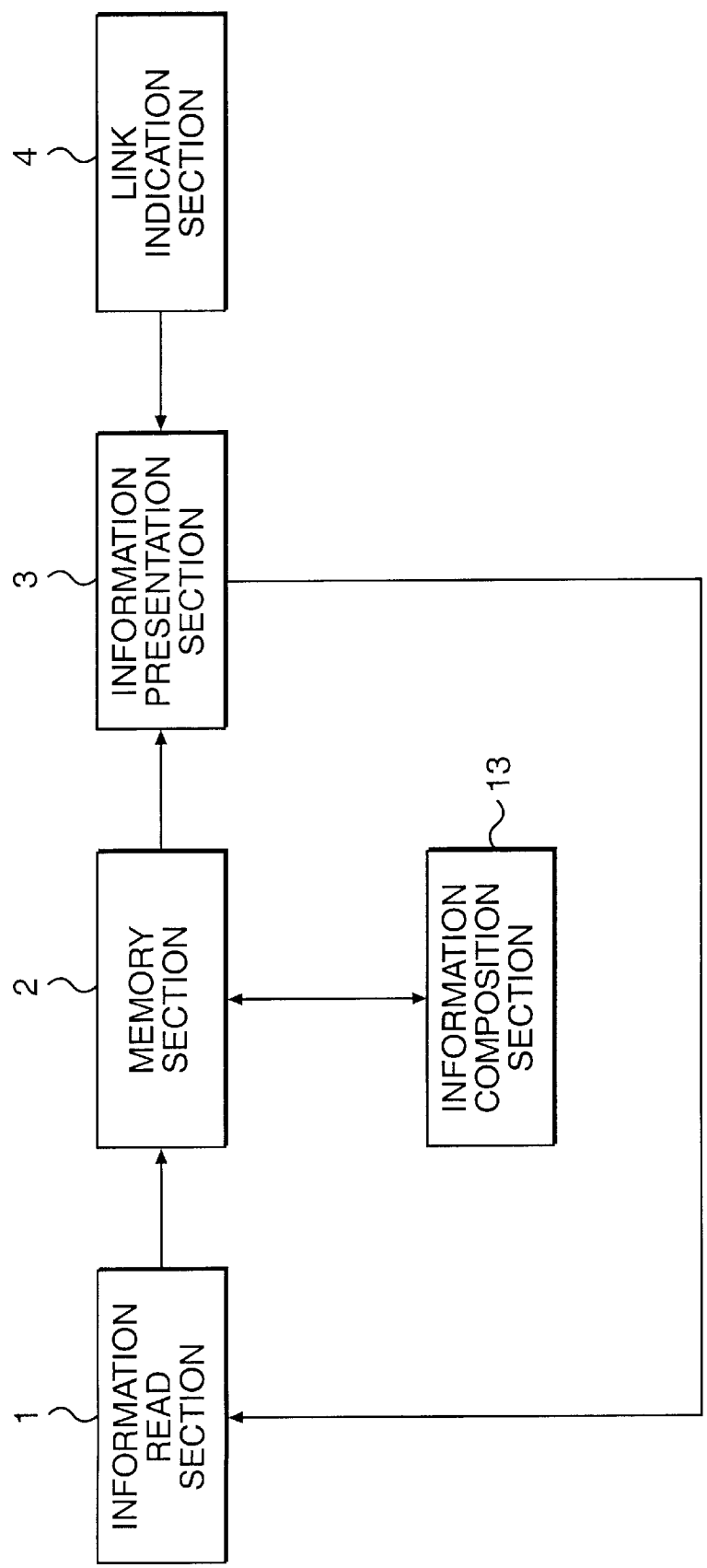
FIG. 25 is a block diagram of the information presentation apparatus according to a sixth embodiment of the present invention.
Figure 26:
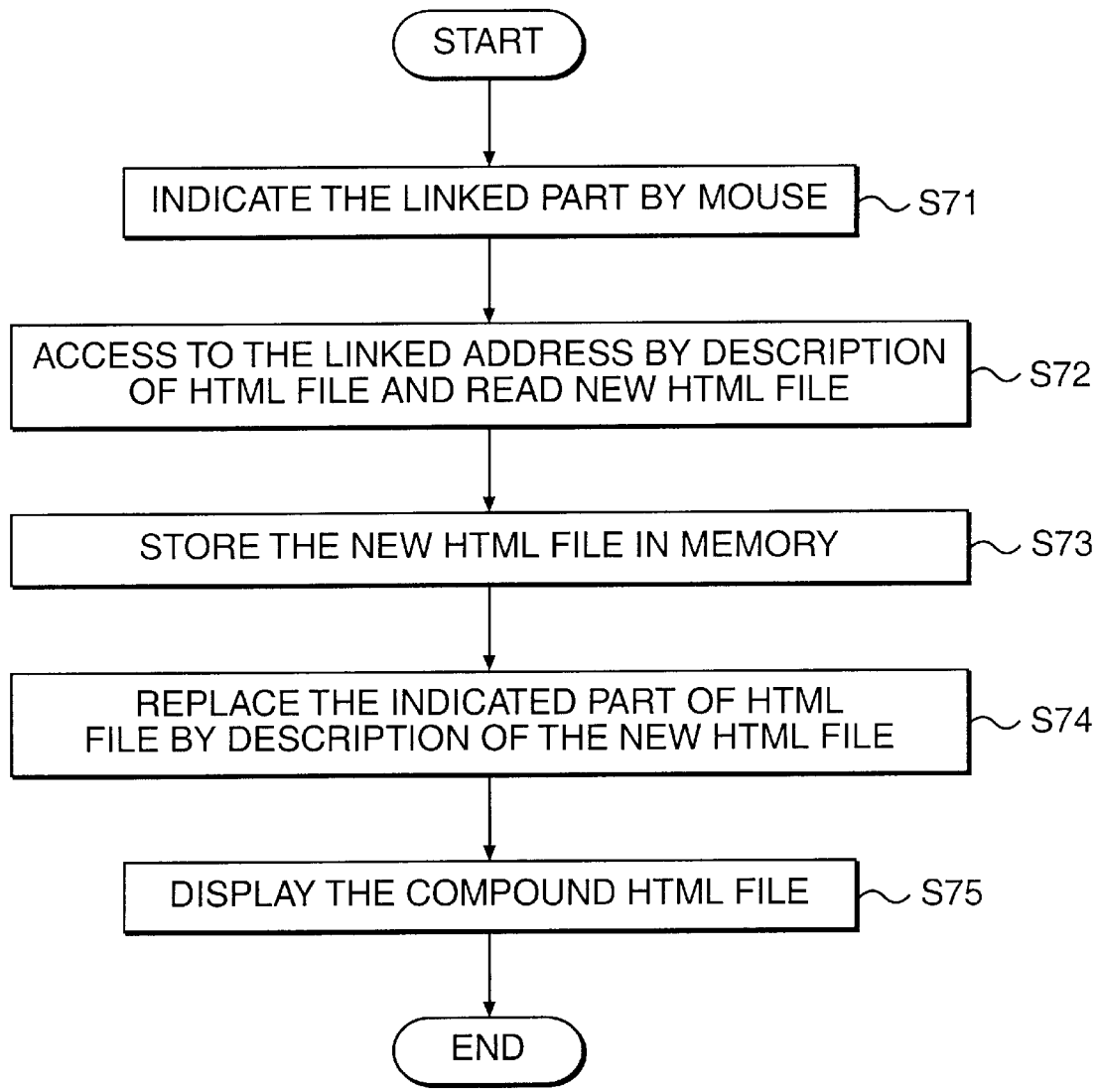
FIG. 26 is a flow chart depicting the processing of the information presentation method according to the sixth embodiment of the present invention.
Figure 28:
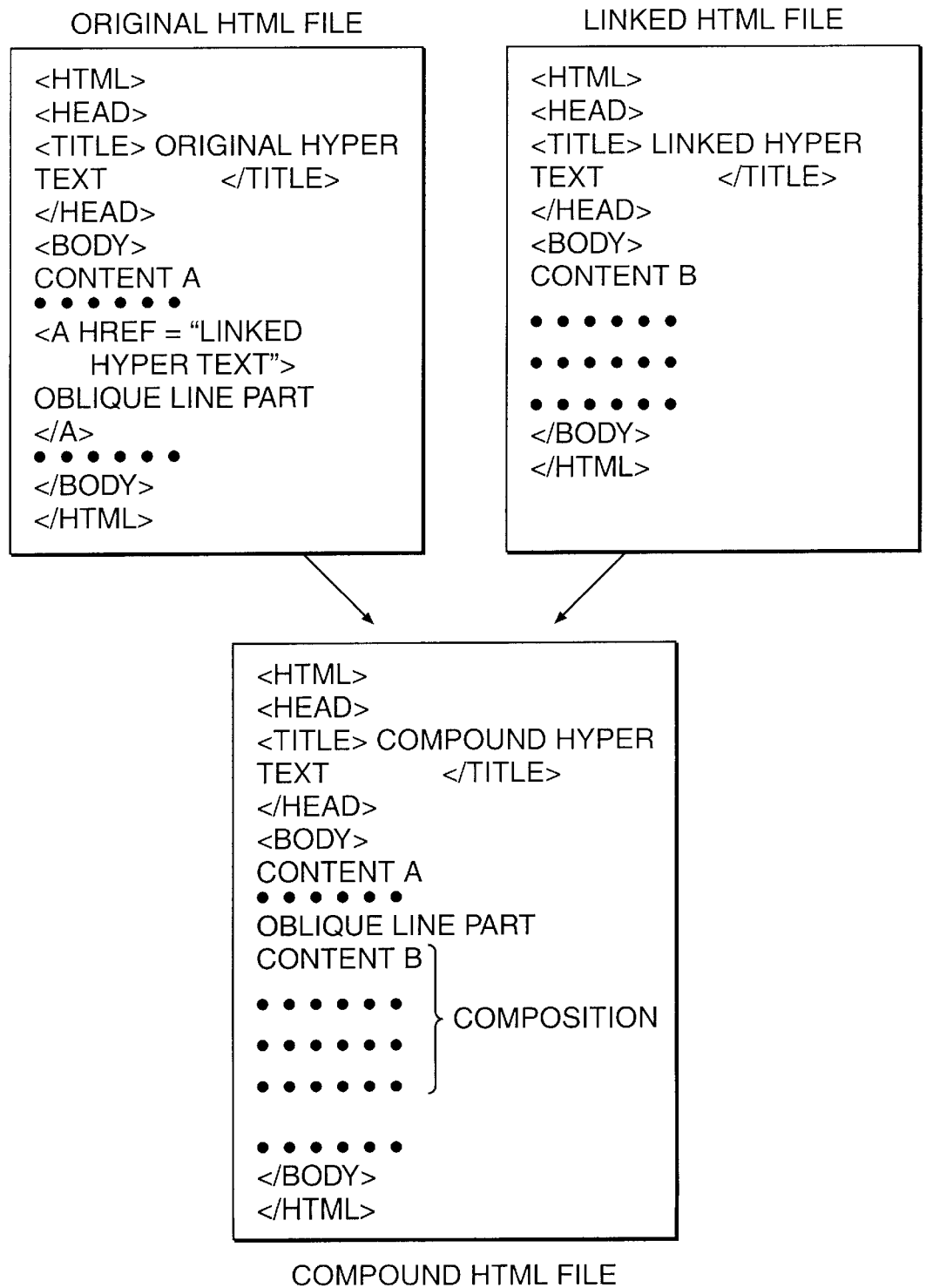
FIG. 28 is an example of the composition of an HTML file.

FIG. 25 is a block diagram of the information presentation apparatus according to the sixth embodiment of the present invention. FIG. 26 is a flow chart depicting the processing of the information presentation method according to the sixth embodiment. In the information presentation apparatus of the sixth embodiment, an information composition section 13 distinguishes this embodiment from the first embodiment. The information composition section 13 replaces the indicated part of displayed file by a description of the linked information and creates a new file. FIG. 27 is the display of the replacement of the indicated part of original hypertext by new hypertext. The description of the linked hypertext is inserted immediately after the original hypertext (oblique line part) (S71,S72,S73,S74 in FIG. 26). FIG. 28 shows the contents of the new file combining the original file and the linked file. As shown in FIG. 28, the description of the linked part <A HREF="LINKED HYPER TEXT"> and </A > of the original HTML file is replaced by a description (CONTENT B) of a part of the linked HTML file. In this way, the compound HTML file is created and displayed to the user (S75 in FIG. 26).

Figure 29:
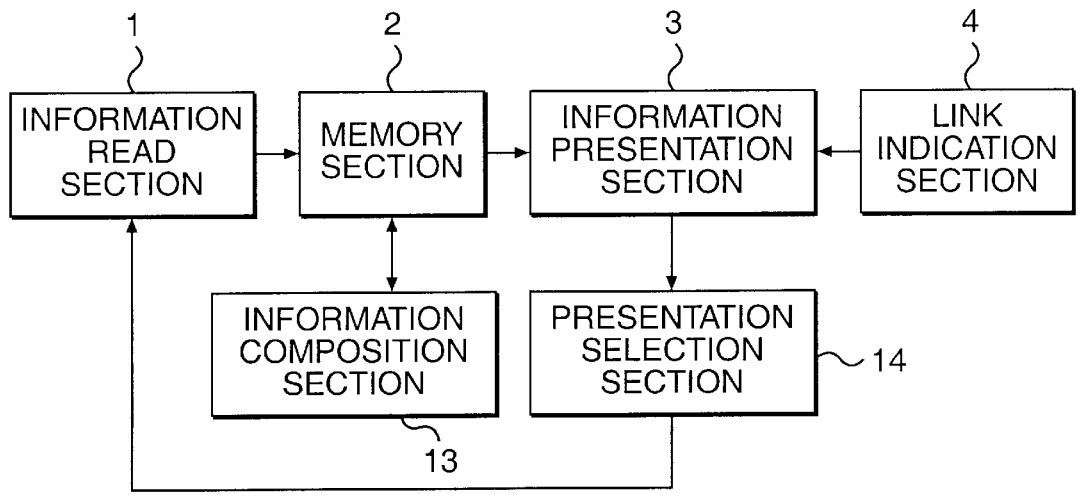
FIG. 29 is a block diagram of the information presentation apparatus according to a modification of the sixth embodiment.

FIG. 29 is a block diagram of a modification of the information presentation apparatus according to the sixth embodiment of the present invention. A presentation selection section 14 distinguishes this embodiment from the sixth embodiment in FIG. 25. The presentation selection section 14 allows the user to determine whether the part of the original file is replaced by the linked information.

Figure 30:
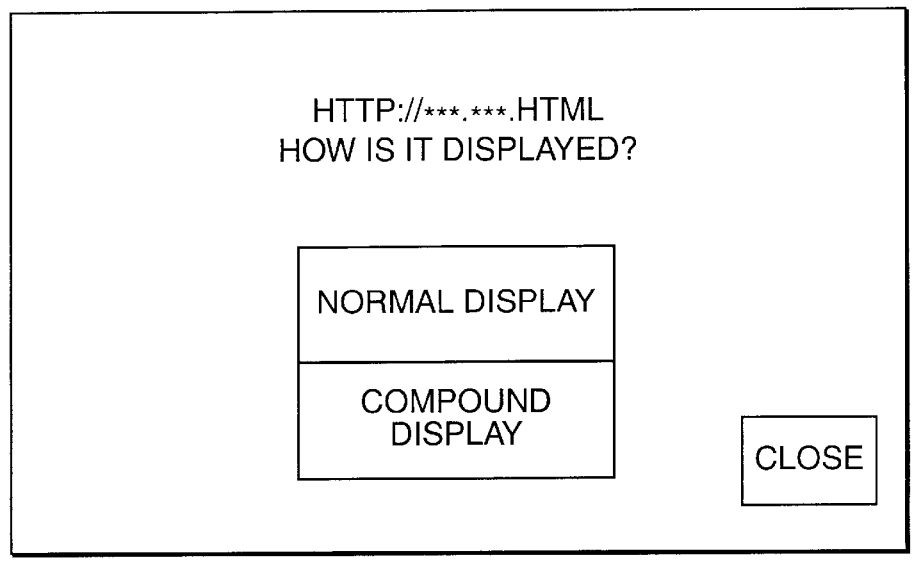
FIG. 30 is an example of a display to select the presentation format according to the sixth embodiment.

FIG. 30 depicts the display of the presentation selection section 14. When the linked part of the original file is indicated, a window is opened in the display as shown in FIG. 30. Two button icons—"NORMAL DISPLAY" and "COMPOUND DISPLAY"—are included in the window. If the icon "COMPOUND DISPLAY" is selected, the linked part of the original file is replaced by the description of the linked file. This compounded new file is then displayed. If the icon "NORMAL DISDLAY" is selected, the linked file is displayed in the whole display area of the information presentation section 3 instead of the original file.

Figure 31:
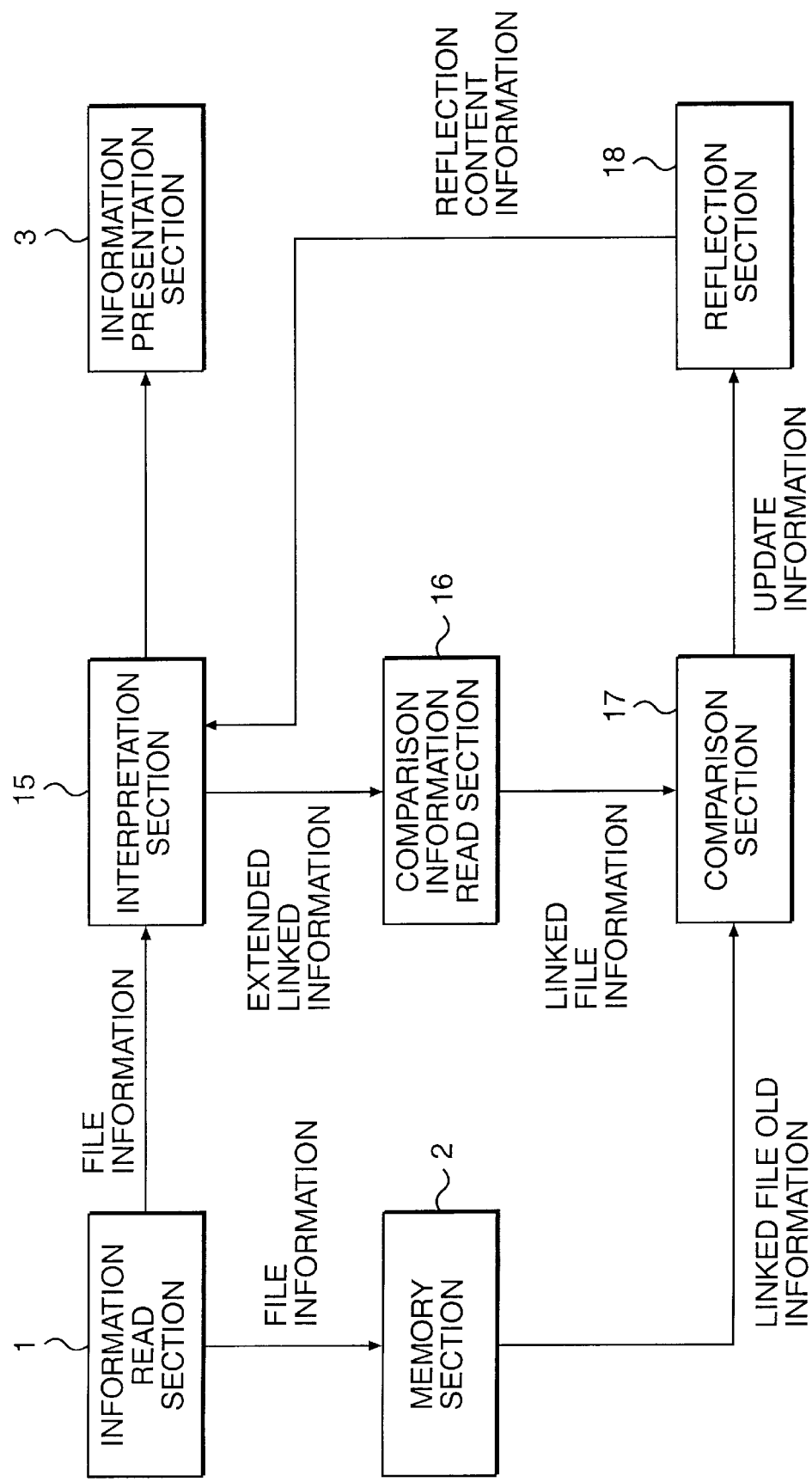
FIG. 31 is a block diagram of the information presentation apparatus according to a seventh embodiment of the present invention.

FIG. 31 is a block diagram of the information presentation apparatus according to the seventh embodiment of the present invention. The information presentation apparatus of the seventh embodiment is comprised of the information read section 1, the memory section 2, the information presentation section 4, an interpretation section 15, a comparison information read section 16, a comparison section 17, and a reflection section 18. FIG. 32 shows an example of HTML file A to which another HTML file B is linked. Assume that HTML file A is located in server A, HTML file B is located in server B, and that server A and the server B are interconnected to a user terminal through a network. The information read section 1 accesses the server indicated by the user through the network and reads out an HTML file or VRML file. For example, if the user indicates the URL of HTML file A, the information read section 1 accesses to the server A and reads HTML file A. The memory section 2 of the user side stores the HTML file and VRML file read by the information read section 1. In case the information read section 1 reads HTML file B before, the HTML file B will be stored in the memory section 2.

Assume that the HTML file B shown in FIG. 33 is already stored in the memory section 2. The interpretation section 15 inteprets the content of the HTML file read by the information read section 1 and generates information to be presented to the user. In this case, the interpretation section 15 interprets the extended description in the HTML file to which the other HTML file is linked. As shown in FIG. 32, the HTML file includes the original description and the extended description. Line (1) in HTML file A of FIG. 32 is the original description to which HTML file B is linked. A line (2) in HTML file B of FIG. 32 is the extended description to check whether the content of the HTML file B is updated. The comparison information read section 16 accesses the server of the other linked file through network and reads out the other linked file. In the case of FIG. 32, HTML file B is read from server B. FIG. 34 shows the HTML file B read by the comparison information read section 16. The comparison section 17 compares HTML file B read by the comparison information read section 16 with HTML file B stored in the memory section 2.

Figure 35:
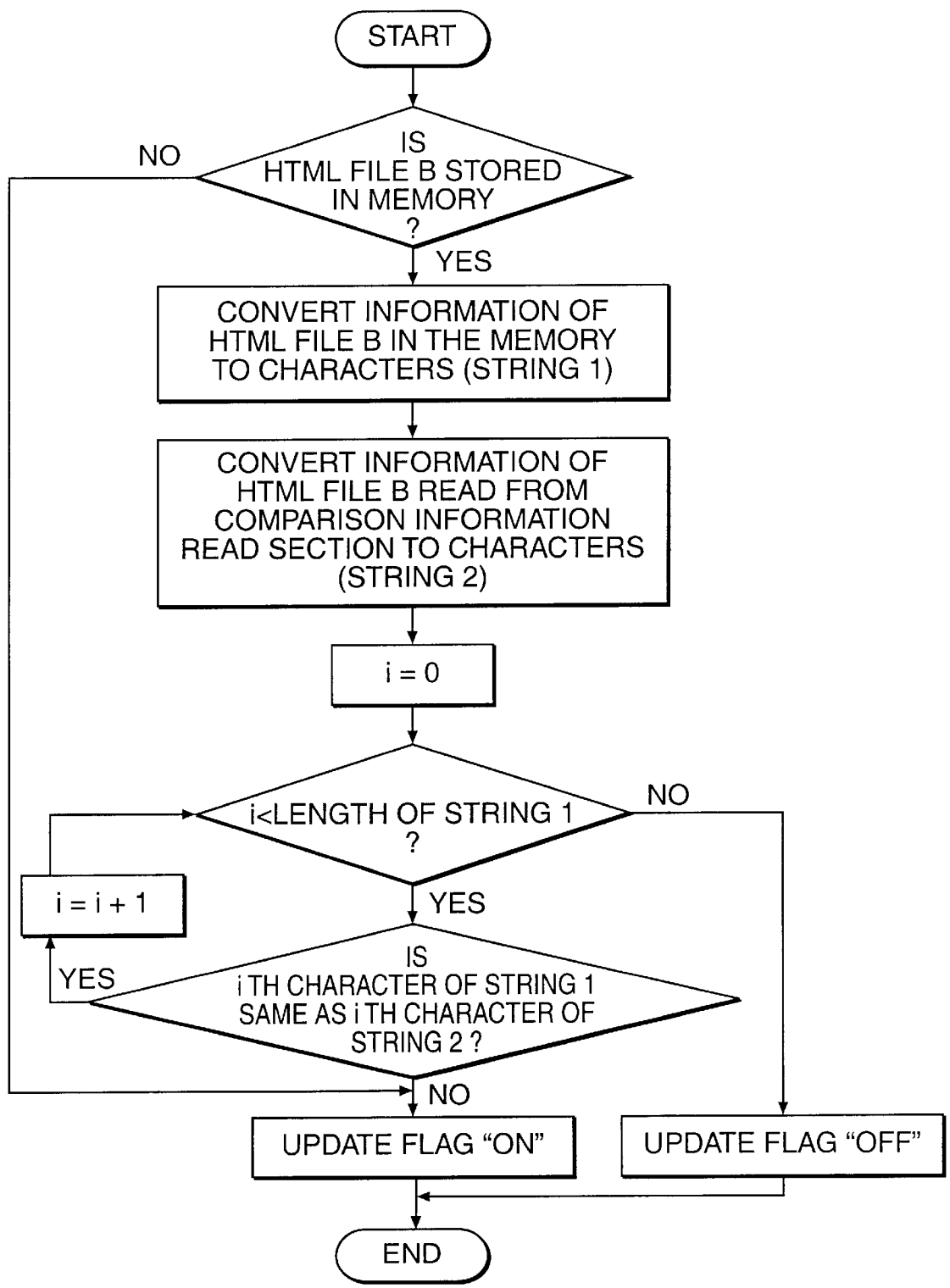
FIG. 35 is a flow chart of the processing of a comparison section according to the seventh embodiment.

FIG. 35 is a flow chart of processing depicting the the comparison section 17. As shown in FIG. 35, each character of read HTML file B is compared with each character corresponding to same position of stored HTML file B. The first character of the seventh line in the read HTML file of FIG. 34 is different from first character of the seventh line in the stored HTML file of FIG. 33. Therefore, the comparison section 17 decides that the HTML file is updated. The reflection section 18 outputs the reflection content information to the interpretation section 15 according to the updated information. For example, if the HTML file is updated, the reflection content information adds the character "New" to the linked part of the HTML file A on display. The information presentation section 3 presents the information of HTML file A generated by the interpretation section 15 to the user. In short, the HTML file A in which the linked part is discriminately included is outputted.

Figures 36, 37, 38:
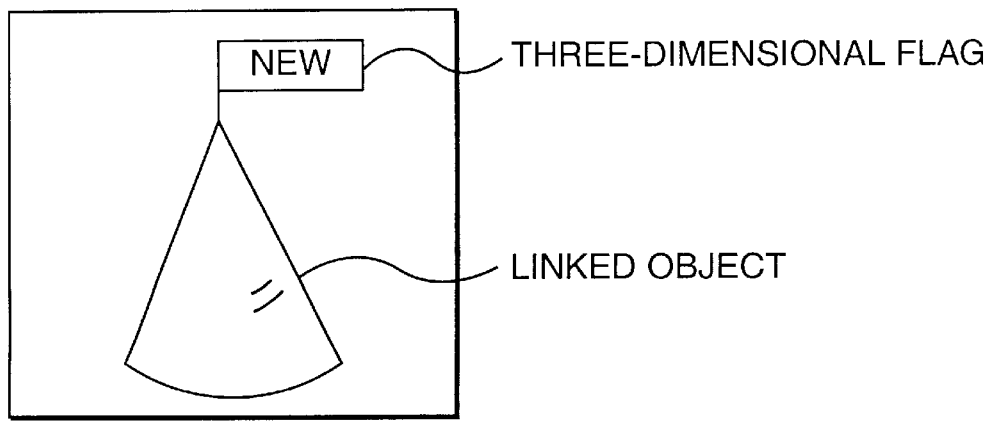
FIG. 36 is an example of a VRML file including an expanded description.
FIG. 37 is an example of the VRML file including an updated description.
FIG. 38 is a three-dimensional image updated by a VRML file.

Next, a modification of the seventh embodiment is explained. While a homepage described by an HTML file is two-dimensional information consisting of text or a still image, a homepage described by a VRML file is three-dimensional information consisting of a CG image. FIG. 36 shows a VRML file that includes an extended description to execute update processing. A third line "WWW preread" in FIG. 36 is a new description added to VRML format. In addition to the prior function of reading out the linked information when the linked part is indicated, "WWW preread" includes the following function. After the VRML file in FIG. 36 is read by the information read section 1 in FIG. 1 the VRML file is interpreted by the interpretation section 15 in FIG. 1. When "WWW preRead" is detected from the VRML file, the comparison information read section 16 reads out the other file information (new file) corresponding to "Linked URL" and the comparison section 17 compares the new file with the old file stored in the memory section 2. The reflection section 18 outputs the reflection content information to the interpretation section according to the result of the comparison. For example, if the comparison result is "updated", the attributes of the color and material of the displayed three-dimensional object are changed. This change of attributes makes it easy for the user to understand that the linked file information is updated. On the other hand, if the comparison result is "non-updated", the attribute is not changed.

FIG. 37 shows a VRML file in which the attributes of material are added to present "updated" to the user. In FIG. 37, lines three to five describe the change of material added by the reflection section 18. According to the description of the change of material, a cone object is brightly displayed. Otherwise, a three-dimensional flag representing "updated" may be added to an original object.

FIG. 38 shows a cone (linked object) to which a three-dimensional flag representing "updated" is added.

Figures 39, 40:
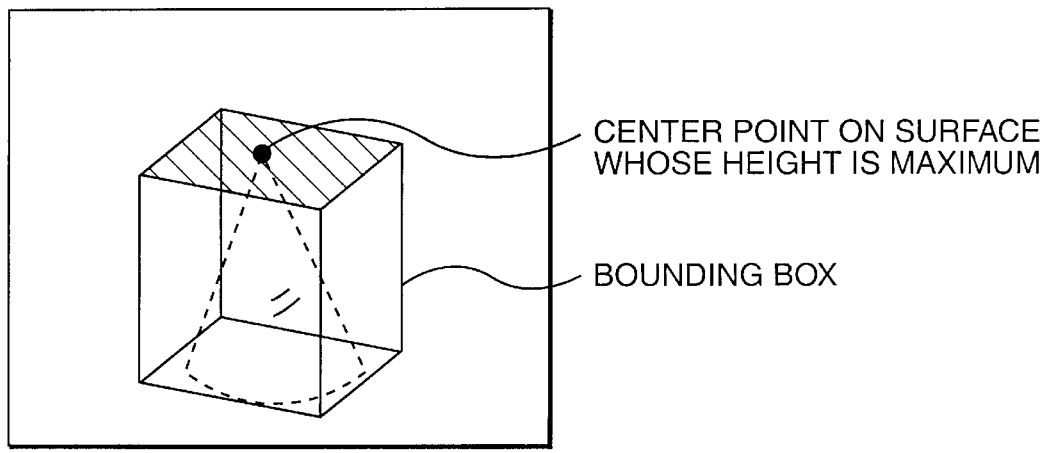
FIG. 39 is an example of a VRML file corresponding to the three-dimensional image in FIG. 38.
FIG. 40 is a schematic diagram of a coordinate conversion of a VRML file in FIG. 39.

FIG. 39 shows the VRML file used to display the cone object in FIG. 38. Six sentences (Lines 7 to 9) contain the instructions to additionally display the three-dimensional flag. In this case, the CG model of the three-dimensional flag is read out according to "WWW In line" of the prior specification of the VRML file. In three sentences (Lines 7 to 9), the display position of the three-dimensional flag is transformed to a position near the cone object. In this coordinate transformation, as shown in FIG. 40, the bounding box of the cone object is calculated and the display position is determined to be centered on the highest surface point of the cone object. In this way, the three-dimensional flag is located near the cone object on display.

In the modification of the seventh embodiment, when the user accesses a VRML file that includes a part linked to another file, the user can ascertain whether the other file is updated or not.

Figure 41:
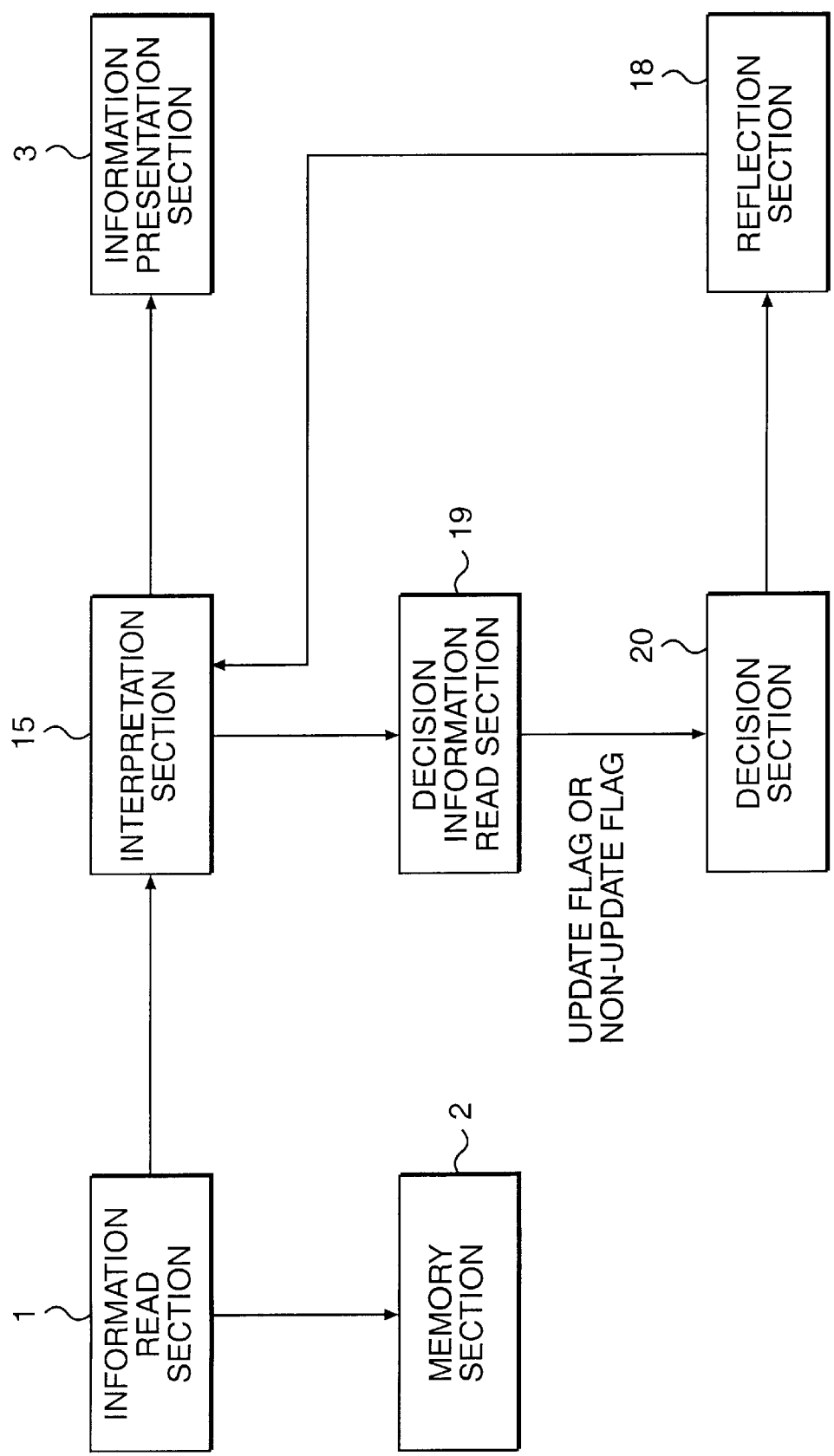
FIG. 41 is a block diagram of the information presentation apparatus according to a modification of the seventh embodiment.

FIG. 41 is a block diagram of a second modification of the seventh embodiment. In comparison with the seventh embodiment in FIG. 31, a decision information read section 19 and a decision section 20 are newly added. If the interpretation section 15 detects that the HTML file includes a description linked to another file, the decision information read section 19 accesses the server of the other file through the network and reads out the other file. Instead of the sentence (2) in FIG. 32, a sentence reading "update flag "ON" or non-update flag "OFF"" is included in the other file (HTML file B) (not shown in FIG. ). The decision section 20 decides that the HTML file B is updated or not according to the flag. In the second modification of the seventh embodiment, it is possible to decide whether the linked file information is updated or not in a short time and to reduce the user's waiting time.

Figure 42:
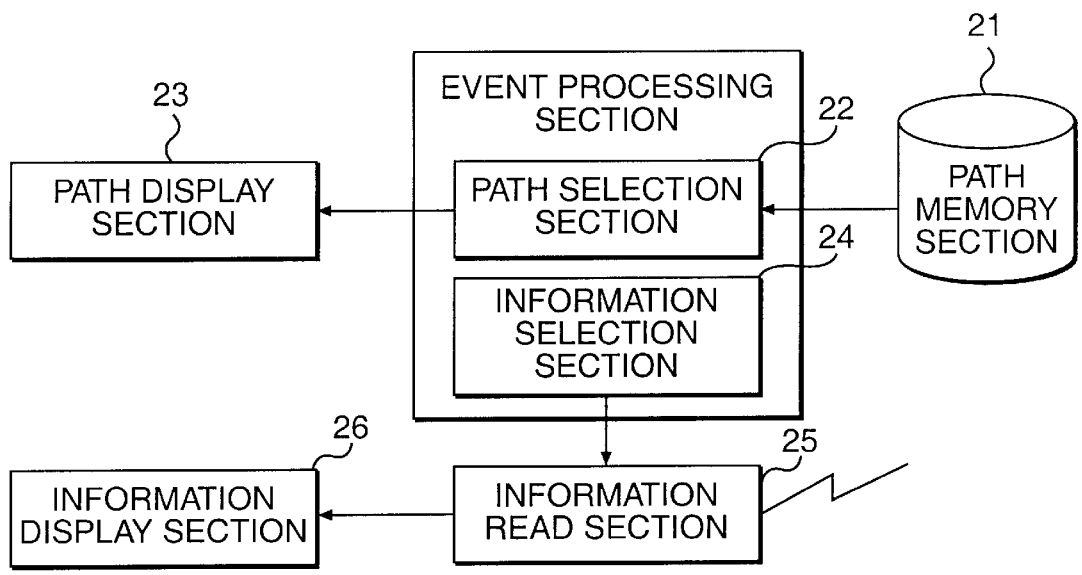
FIG. 42 is a block diagram of the information presentation apparatus according to an eighth embodiment of the present invention.
Figure 43:
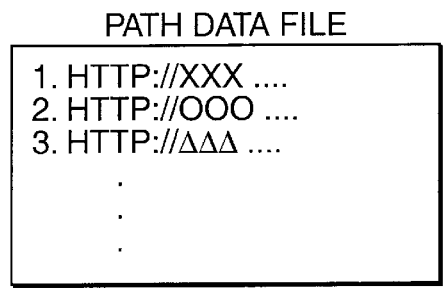
FIG. 43 is a schematic diagram of an address table to store path data according to the eighth embodiment.
Figure 44:
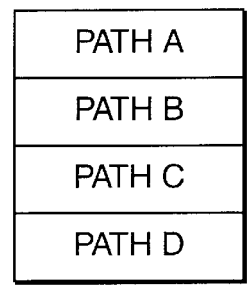
FIG. 44 is a schematic diagram of path table for the user to indicate the path name on display.

FIG. 42 is a block diagram of the information presentation apparatus according to the eighth embodiment of the present invention. The information presentation apparatus of the eighth embodiment includes a path memory section 21, a path selection section 22, a path display section 23, an information selection section 24, an information read section 25, and an information display section 26. The path memory section 21 stores a series of addresses representing the locations of homepage distributed on the World Wide Web (WWW). Each address has a Uniform Resource Locator (URL) to uniquely determine the location of the homepage. The series of address represents the locations of plural homepages of the same kind, same purpose or same theme. For example, in the case of plural homepages relating to one product, a sequence addresses is stored in order to watch these homepages in order. In the case where one object is explained by plural homepages distributed respectively, the address of the first homepage containing a basic explanation, an address of the second homepage containing an applied explanation and an address of a third homepage containing an exercise are stored in order. FIG. 43 shows the address table in the path memory section 21. In the address table, plural addresses of homepages are stored in order by path units. The path selection section 22 is used to select the user's desired path from among a plurality of paths. As a selection method, the path table including the plurality of paths is displayed as shown in FIG. 44. The user selects a path by clicking the mouse. A part of each path name is a button to input the mouse's indication, and each button corresponds to each path data file. When one path name is selected, a corresponding path data file is read from the path memory section 21 and a routine to display the path is activated.

Figure 45:
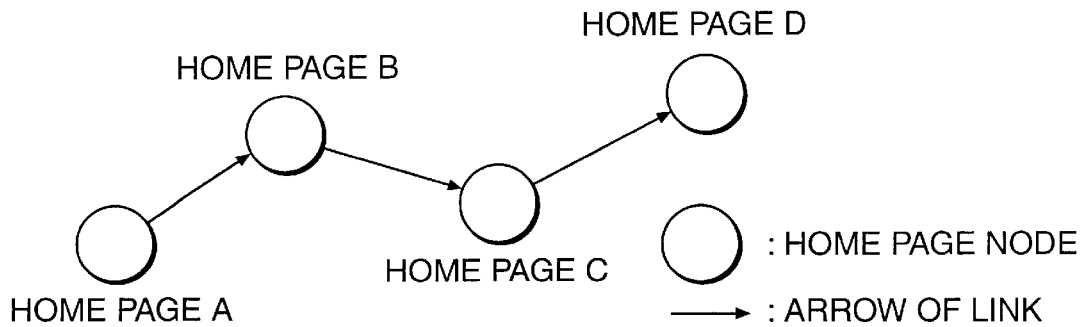
FIG. 45 is a schematic diagram of the path chart on the display.

FIG. 45 shows a path chart on the path display section 23. In the path chart, each homepage is represented as a node and the intervals between two nodes are linked by a line. In FIG. 45, each homepage node is a circle and each line is an arrow. The direction of the arrow is determined by the location order of the homepage of the path data file. After the user views one homepage, he can understand which homepage to view next only if he views the path chart on the display. The path chart in FIG. 45 may be represented as an HTML file or VRML file according to the path data file. In the case of an HTML file, a gif file of a still image is linked to the address of the homepage. In this case, the homepage node in FIG. 45 is replaced by the still image on the display. The arrow between the two homepage nodes is also replaced by the still image. If the path data file in the path memory section 21 is converted to an HTML file, the still image of the homepage node is read out according to the address order of the homepage of the path data file, and the still image of arrow is also located between the still images of two homepage nodes.

In the case of a VRML file, a three-dimensional object model (VRML format) is linked to the address of the homepage. The arrow between two homepage nodes is also represented as a three-dimensional object model. The data format of the path data file may be HTML or VRML. The information selection section 24 in FIG. 42 is used for indicating the homepage node in the path chart. For example, the cursor of the mouse can be moved to the homepage node in the path chart and the address of the homepage node indicated by a click of the mouse. The information read section 25 accesses the indicated address through the network and reads out the HTML or VRML file. The information display section 26 displays the HTML or VRML file read by the information read section 25.

Figure 46:
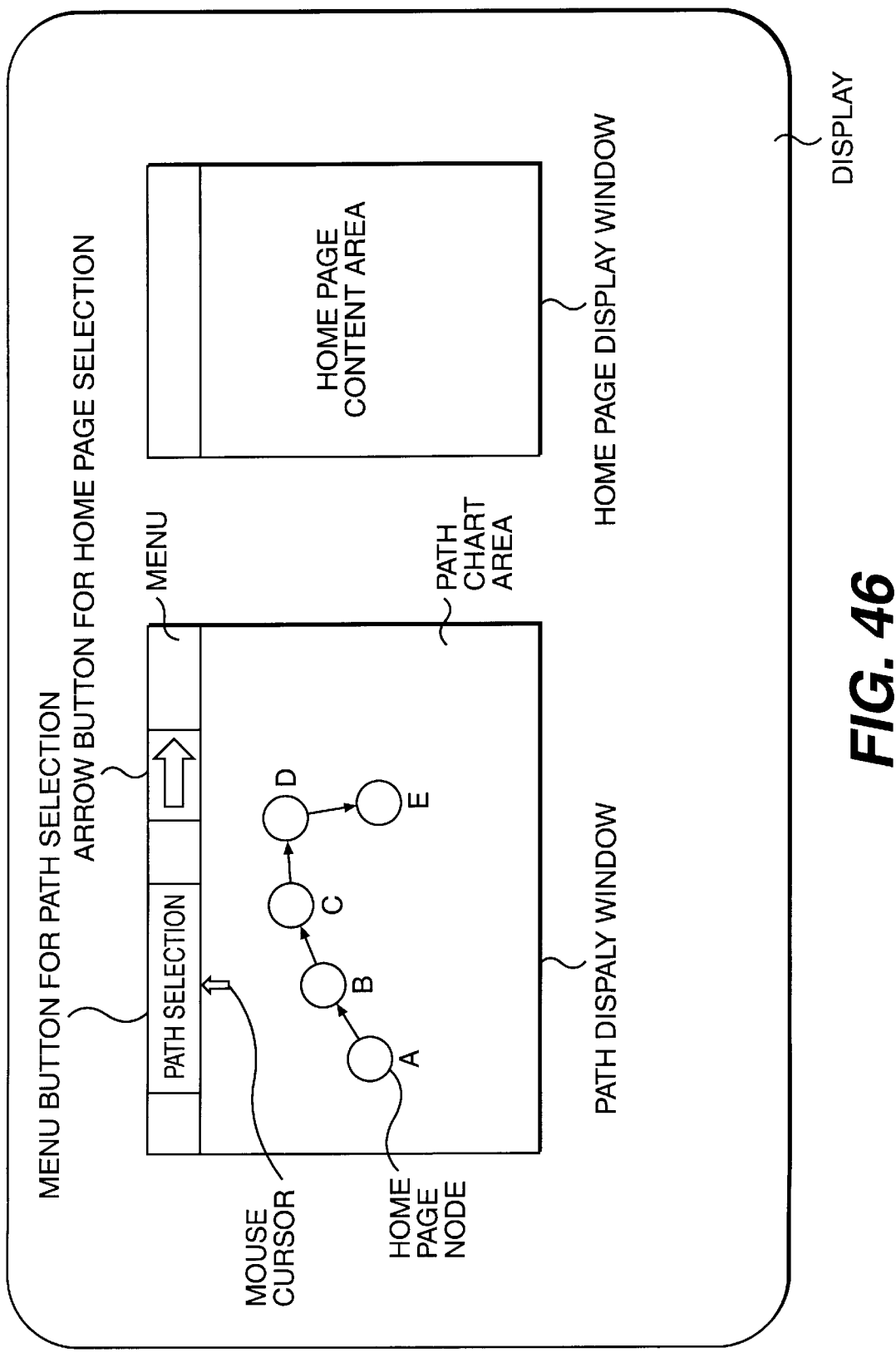
FIG. 46 is a schematic diagram of the display status consisting of a window for displaying the path and a window for displaying the homepage.

FIG. 46 shows an example of a display of the eighth embodiment. As shown in FIG. 46, a path display window and a homepage display window are included in the display. The path display window consists of the path chart area and menu for selection. The homepage display window consists of a homepage content area. In the path display window, the menu for selecting the path is included. When the user selects the menu by clicking the mouse, the path table is displayed and the user selects one path. In the path chart area, the selected path is displayed as the path chart. The user selects one homepage node to view by a click of the mouse. The address of the selected homepage node is supplied to the information read section 25. The information read section 25 reads out the homepage according to the address. The homepage is displayed in the homepage content area. The selection of homepage may be executed by a menu button to select the homepage according to path sequence. This menu button is shown as an arrow button for homepage selection in FIG. 46. When the user pushes the arrow button, the next homepage is displayed in the homepage content area. For example, if the user pushes the arrow button while watching homepage A, homepage B is displayed instead of the homepage A. Using this arrow button, a plurality of homepages are repeatedly displayed according to the path sequence.

Figure 47:
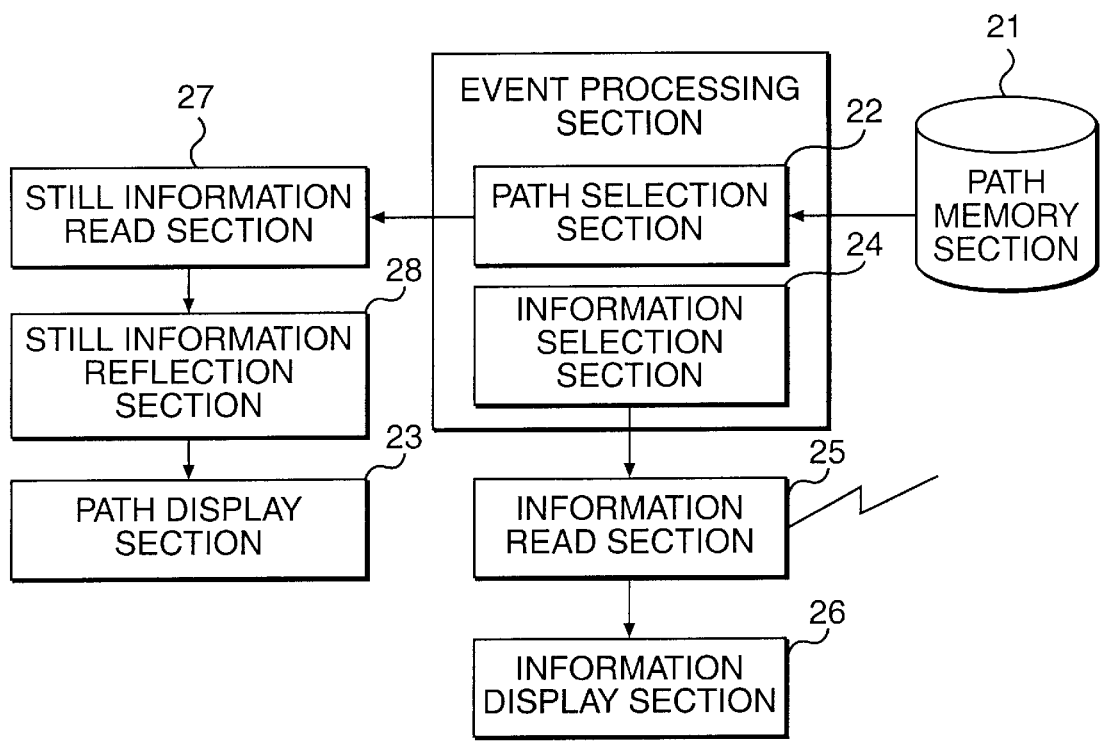
FIG. 47 is a block diagram of the first modification of the eighth embodiment according to the present invention.

FIG. 47 is a block diagram of the information presentation apparatus according to first modification of the eighth embodiment. In comparison with the block diagram of FIG. 42, this modification adds a still information read section 27 and a still information reflection section 28. The still information read section 27 extracts the data format, data quantity, and update situation of the homepage to be read. The data format of the homepage is determined by an extension identifier of a file name corresponding to homepage address. For example, if the homepage is an HTML file, the extension identifier is ".html". If the homepage is a VRML file, the extension identifier is ".wrl". The data quantity of the homepage is included in header information (Document info) added to the homepage. The update situation is also included in the header information. In this way, the still information read section 27 extracts the still information of each homepage when one path is selected by the path selection section 22. The still information reflection section 28 converts the still information to a format that can be more easily understood by the user. This conversion result is reflected to the display by the path display section 23. As for reflection of the data format, the still information of the gif format of an HTML file or three-dimensional model of a VRML file is displayed as the homepage node in the path chart. As for the reflection of the data quantity, the size of homepage is displayed in the homepage content area and enlarged or reduced according to the data quantity. As for reflection of the update situation, the header information is cached on the user side while the homepage is referred. This cached header information (new header information) is compared with prestored header information (old header information) of the same homepage. If the update time of the new header information is different from that of the old header information, the color or brightness of the homepage will be changed.

Figure 48:
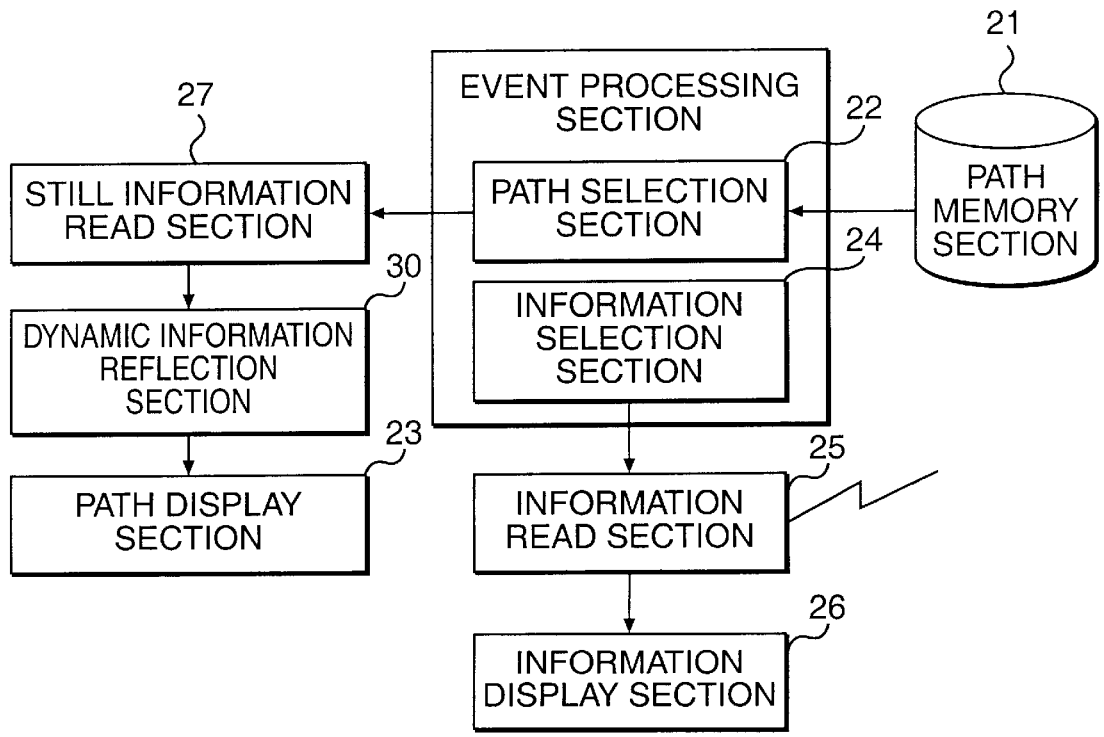
FIG. 48 is a block diagram of the second modification of the eighth embodiment according to the present invention.

FIG. 48 is a block diagram of the information presentation apparatus according to a second modification of the eighth embodiment. In comparison with the block diagram of FIG. 42, this modification adds a dynamic information read section 29 and a dynamic information reflection section 30. The dynamic information read section 29 extracts change information over time, such as the access status of the homepage and congestion situation of network. For example, the dynamic information read section 29 asks the server controlling the homepage how many times the homepage has been accessed during the past several hours. The server prepares an access counter to memorize the number of times the homepage has been accessed. When the dynamic information read section 29 asks the server, the server provides this number to the dynamic information read section 29. The dynamic information read section 29 also asks the server about the number of users accessing the server in order to determine the congestion situation of the path. The server then executes a program that selects which homepage will be accessed next based on the congestion information. The congestion status is determined by the number of times access has occurred during a predetermined time per unit of homepage. The dynamic information read section 29 asks the server of each homepage how many instances of access are being executed between homepages along the path. The dynamic information shows that the user side is reading out the homepage. This means that the user side begins to read out the next homepage B after homepage A is read out. The situation that homepage B is read out is also the dynamic information. As mentioned-above, the dynamic information read section 29 extracts the dynamic information of each homepage along the path when the path is selected by the path selection section 22. Especially, number of instances of access and congestion situation of each homepage are extracted before the path chart is displayed. The dynamic information read section 29 sends the dynamic information to the dynamic information reflection section 30 at predetermined interval. The dynamic information reflection section 30 converts the dynamic information to a format that can be easily understood by the user viewing the display. The conversion result is reflected to the display of the path display section 23. For example, in order to reflect the number of times the homepage has been accessed to the path chart, the color of a homepage accessed many times in the past will be bright while color of a homepage accessed only a few times will be dark. In short, the color is gradually changed according to the number of times the homepage is accessed. Otherwise, the homepage is displayed as animation using aplet of JAVA or script to generate dynamic animation. In short, the homepage accessed many times is displayed as dynamic animation, and the homepage accessed only a few times is displayed as still animation. The congestion situation of a homepage is reflected to the arrow between homepages in the path chart. For example, in the case of heavy access from homepage A to homepage B, the arrow is largely displayed, or an animated image of a crowd moving from homepage A to homepage B is displayed. In particular, when displaying the path chart by three-dimensional CG of VRML, a human object is shown moving along a road from the three-dimensional object of homepage A to the three-dimensional object of homepage B. In the case of heavy access, many human objects are shown moving along the road. The character of the user is displayed as a two-dimensional or three-dimensional object moving along the arrow between the homepages in the path chart.

Figure 49:
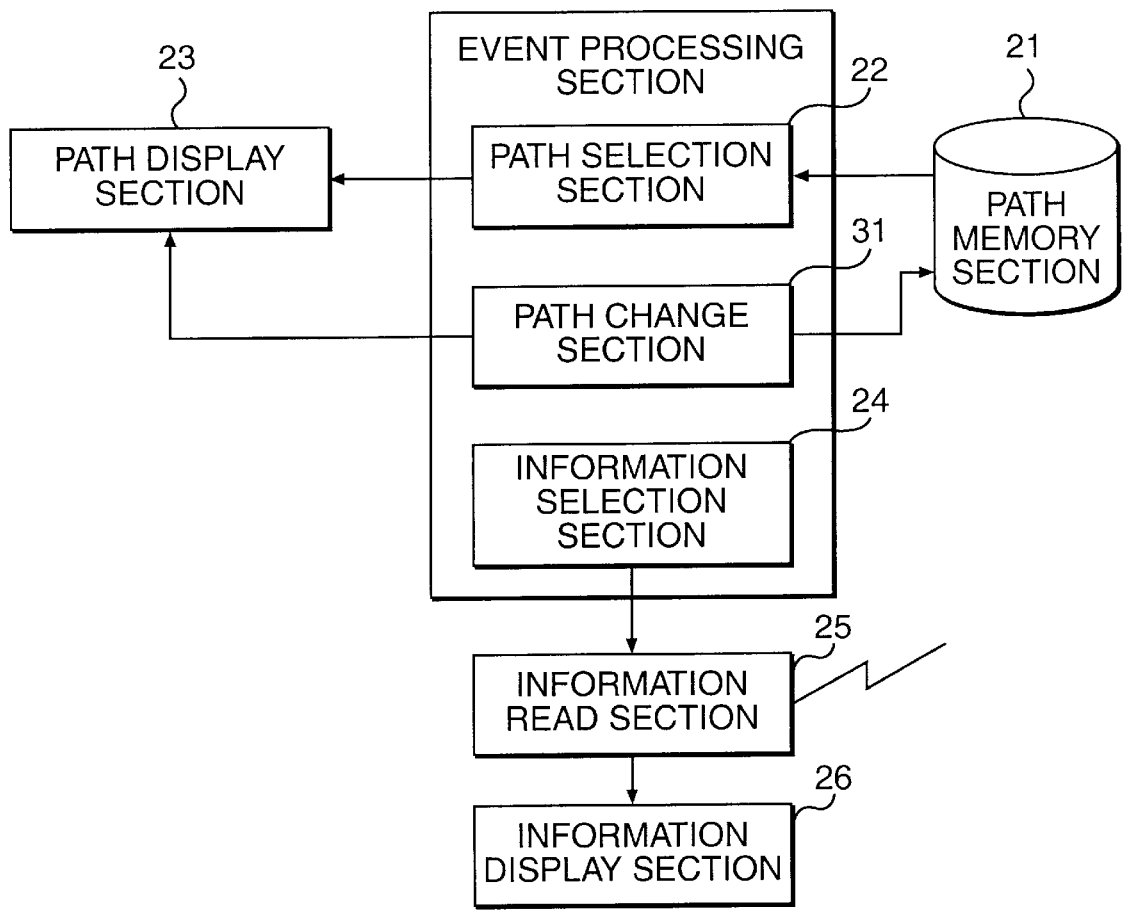
FIG. 49 is a block diagram of the third modification of the eighth embodiment according to the present invention.

FIG. 49 is a block diagram of the information presentation apparatus according to a third modification of the eighth embodiment. In comparison with the block diagram of FIG. 42, this modification adds a path change section 31. The path change section 31 adds the address of the new homepage to the path stored in the path memory section 21, deletes the address of the homepage in the path, changes a route of the path, and creates new path data file. The path change section 31 is a part of the event processing by mouse or key. The change result is stored in a path data file in the path memory section 21.

An example for adding the address of a new homepage will be explained. In case of displaying new homepage, the user inputs the address (URL) of the new homepage by key or he clicks on a part linked to the new homepage in the displayed homepage to indicate the address of the new homepage. The information read section 25 accesses the address of the new homepage and the new homepage is displayed through the information display section 26. In this manner, when the user wants to add another homepage to the path after the other homepage is displayed, an "ADD" button to the path is displayed as one menu item of the window on the path display section 23. By clicking the one menu item, the new homepage is added to the path. The address of the new homepage is immediately added to last portion of data file of the path selected, and this path data is restored in the path memory section 21. In the case of adding an address to the present path, the path display section 23 reads out the updated path data and displays a new path chart. In the new path chart, the new homepage node is linked to the last homepage node. In the case of adding an address to a path different from the present path, the user indicates a menu item of path selection and selects a path name to be added from among plural path names on the path display section 23. Then, he clicks the "ADD" button to the path. In the case of creating new path data and adding to prestored path data, a menu item to create a new path is opened in the path display window. The user inputs the name of the new path data to a dialog box of key input and clicks the "ADD" button to the path. The new path data is stored in the path memory section 21. The user clicks a linked part in the homepage on the information display section 26 by mouse. The new homepage is added to the path and dropped into the path chart on the path display section 23. In this case, the path data is updated and a new homepage node is linked to a last homepage node of the path chart.

Next, an example of deleting the homepage will be explained. The user selects a homepage node to be deleted in the path chart by mouse. The path change section 31 has functions to receive a mouse event on the path display section 23 and to assign an address corresponding to the homepage node selected. In order to discriminate this operation from the operation of reading out the homepage information, a change button to path edit is added to the menu item. In the case of the change button "ON", a mouse event is executed as adding a homepage node selection. If a delete button is prepared as the menu item, when the user clicks on it, the address of the selected homepage is deleted from the path data file and an updated path data file is restored in the path memory section 21. The path display section 23 reads out the updated path and displays an updated path chart.

Next, an example of changing the link structure of the path will be explained. On the path chart of the path display section 23, a plurality of homepage nodes are arranged, and link arrows are changed by mouse. When a button for path edit turns "ON", a mouse event is initiated to execute path edit. The user clicks a homepage node by mouse to change a position of the homepage node on the path chart. The arrows of the link between homenodes are enlarged or reduced to preserve link structure described in the path data file. In case of changing the link structure, the arrow to be changed is clicked by mouse, and the point of the arrow is moved to the homepage node to be linked on the path chart. For example, in case of an arrow X extended from Homepage A to Homepage B, the Homepage A is defined as a parent and the Homepage B is defined as a child in the link structure. When the point of the arrow X is moved to Homepage C in the path chart, the Homepage C is defined as the child instead of the homepage B. This operation result on the path chart is reflected to the path data file and stored in the path memory section 21 by the arrow of the changed link. The updated path data file is restored in the path memory section 21.

The memory can be used to store instructions for performing the process described above. Such memory can be in the form of a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. Information presentation apparatus, comprising:

memory means for storing first information including at least one part corresponding to second information and a summary of the second information, a summary of the second information being directly described in the first information;

display means for displaying the first information excluding the summary; and indication means for indicating the one part corresponding to the second information in the first information displayed by said display means;

wherein said display means displays the summary of the second information described in the first information in response to the indication of the one part by said indication means.

2. The information presentation apparatus according to claim 1, wherein said display means displays an icon for a user to determine whether the second information is read from a file.

3. The information presentation apparatus according to claim 2, further including read means for reading the second information from the file if the icon to read the second information is indicated by said indication means, wherein said display means displays the second information instead of the summary.

4. The information presentation apparatus according to claim 3, wherein said read means reads the summary from the file according to an address and data format described in the first information if the one part is indicated by said indication means, and wherein said memory means stores the summary read by said read means.

5. The information presentation apparatus according to claim 4, wherein the data format is one of text data, sound data, still image data and three-dimensional CG.

6. The information presentation apparatus according to claim 1, wherein the summary of the second information is described in the first information.

7. Information presentation apparatus, comprising:

memory means for storing first information including at least one part corresponding to second information;

display means for displaying the first information;

indication means for indicating the one part;

read means for reading the second information from a file in response to the indication of the one part; and summary creation means for extracting a portion of the second information as a summary, and for changing a description of the one part in the first information as a linked part of the summary;

wherein said memory means stores the summary as linked information of the one part in the first information.

8. The information presentation apparatus according to claim 7, wherein said display means displays the summary read from said memory means in response to a next indication of the one part.

9. Information presentation apparatus, comprising:

memory means for storing first information including at least one part corresponding to second information;

display means for displaying the first information;

indication means for indicating the one part of the first information displayed by said display means to read the second information from a file; and inquiry means for inquiring to a server of the file whether the second information is accessible;

wherein said display means displays the answer to the inquiry and an icon to determine whether the second information is displayed or not.

10. The information presentation apparatus according to claim 9, further including read means for reading the second information from the file if the icon to display the second information is indicated.

11. Information presentation apparatus, comprising:

memory means for storing first information including at least one part corresponding to second information;

display means for displaying the first information;

indication means for indicating the one part of the first information displayed by said display means;

wherein said display means displays an icon to select the data type of the second information according to the data type described in the one part of the first information; and read means for reading the second information according to the data type selected by said indication means.

12. Information presentation apparatus, comprising:

memory means for storing first information including at least one part corresponding to second information the second information being stored in a file;

display means for displaying the first information;

indication means for indicating the one part of the first information displayed by said display means;

decision means for deciding whether the second information is already stored in said memory means;

wherein said display means displays an icon to indicate whether a back read of the second information is executed if the second information is not stored in said memory means; and read means for reading the second information from the file without displaying if the back read is indicated by said indication means.

13. The information presentation apparatus according to claim 12, wherein said display means displays the icon if the second information is to be stored in said memory means.

14. The information presentation apparatus according to claim 13, wherein said display means informs a user that the second information is read if the second information is decided to be read from the file, and displays an icon to stop the reading of the second information.

15. Information presentation apparatus, comprising:

memory means for storing first information including at least one part corresponding to second information;

display means for displaying the first information;

indication means for indicating the one part of the first information displayed by said display means;

read means for reading the second information in response to the indication of the one part; and p1 composition means for replacing the one part of the first information by the second information to create a compound information, wherein said display means displays the compound information instead of the first information.

16. Information presentation apparatus, comprising:

first read means for reading first information and second information from a file, wherein the first information includes at least one part corresponding to the second information;

memory means for storing the first information and the second information;

interpretation means for deciding whether the first information includes an extended description of the one part to check an update status of the second information;

second read means for newly reading the second information from the file if the first information includes the extended information;

comparison means for comparing the second information read by said second read means with the second information stored in said memory means;

reflection means for outputting reflection information of the update status compared by said comparison means; and presentation means for presenting the first information to a user, wherein the reflection information is added to the one part of the first information.

17. The information presentation apparatus according to claim 16, wherein the second information in the file includes update flag representing whether the second information is updated in comparison with the second information read by said first read means, and, wherein said comparison means decides whether the second information is updated in accordance with the update flag.

18. An information presentation apparatus for presenting information distributed on a network, comprising:

path memory means for storing a plurality of paths, each path representing a series of addresses, each address representing a location of each distributed piece of the information;

path selection means for selecting one path from the plurality of paths;

path display means for displaying the one path as the series of addresses;

information selection means for selecting one address from the series of addresses;

information read means for reading the information from the network according to the one address; and information display means for displaying the information read by said information read means.

19. The information presentation apparatus according to claim 18, further comprising still information read means for reading still information of each address of the one path; and still information reflection means for reflecting the still information to the each address of the one path on said path display means.

20. The information presentation apparatus according to claim 18, further comprising dynamic information read means for reading dynamic information of each address of the one path; and dynamic information reflection means for reflecting the dynamic information to the each address of the one path on said path display means.

21. The information presentation apparatus according to claim 18, further comprising path change means for changing the series of addresses in the paths stored in said path memory means, and for creating a new path as a series of new addresses.

22. A method for presenting information, comprising the steps of:

storing first information including at least one part corresponding to second information, a summary of the second information being described in the first information:

displaying the first information excluding the summary;

indicating the one part corresponding to the second information in the displayed first information; and displaying the summary of the second information described in the first information in response to the indication of the one part.

23. A method for presenting information, comprising the steps of:

storing first information including at least one part corresponding to second information;

displaying the first information;

indicating the one part of the displayed first information to display the second information;

reading the second information from a file in response to the indication of the one part; and extracting a portion of the second information as a summary;

changing a description of the one part in the first information as a linked part of the summary; and storing the summary as a linked information of the one part in the first information.

24. A method for presenting information, comprising the steps of:

storing first information including at least one part corresponding to second information;

displaying the first information;

indicating the one part of the displayed first information to read the second information from a file;

inquiring to a server of the file whether the second information is accessible; and displaying the answer to the inquiry and an icon to determine whether the second information is displayed or not.

25. A method for presenting information, comprising the steps of:

storing first information including at least one part corresponding to second information stored in a file;

displaying the first information;

indicating the one part of the displayed first information;

displaying an icon to select the type of data of the second information according to the type of data described in the one part of the first information; and reading the second information corresponding to the selected type of data from the file.

26. A method for presenting information, comprising the steps of:

storing first information including at least one part corresponding to second information stored in a file;

displaying the first information;

indicating the one part of the displayed first information;

determining whether the second information is already stored or not;

displaying an icon to determine whether a back read of the second information is executed or not if the second information is not stored; and reading the second information without displaying from the file if the back read is indicated.

27. A method for presenting information, comprising the steps of:

storing first information including at least one part corresponding to second information;

displaying the first information;

indicating the one part of the displayed first information;

reading the second information in response to the indication of the one part;

replacing the one part of the first information by the second information to create a compound information; and displaying the compound information instead of the first information.

28. A method for presenting information, comprising the steps of:

reading first information and second information from a file, wherein the first information includes at least one part corresponding to the second information;

storing the first information and the second information;

determining whether the first information includes an extended description of the one part to check an update status of the second information;

reading the second information newly from the file if the first information includes the extended description;

comparing the new read second information with the stored the second information;

outputting reflection information of the update status from the comparing step; and presenting the first information to a user, wherein the reflection information is added to the one part of the first information.

29. A method for presenting information distributed on a network, comprising the steps of:

storing a plurality of paths, each path representing a series of addresses, each address representing a location of each distributed piece of information;

selecting one path from the plurality of paths;

displaying the one path as the series of addresses;

selecting one address from the series of addresses;

reading the information from the network according to the one address; and displaying the information read at the reading step.

30. A computer readable memory containing computer-readable instructions to present information, comprising:

instruction means for causing a computer to store first information including at least one part corresponding to second information, a summary of the second information being directly described in the first information;

instruction means for causing a computer to display the first information excluding the summary;

instruction means for causing a computer to indicate the one part corresponding to the second information in the displayed first information; and instruction means for causing a computer to display the summary of the second information described in the first information in response to the indication of the one part.

31. A computer readable memory containing computer-readable instructions to present information, comprising:

instruction means for causing a computer to store first information including at least one part corresponding to second information;

instruction means for causing a computer to display the first information;

instruction means for causing a computer to indicate the one part of the displayed first information to display the second information;

instruction means for causing a computer to read the second information from a file in response to the indication of the one part;

instruction means for causing a computer to extract a portion of the second information as a summary;

instruction means for causing a computer to change a description of the one part in the first information as a linked part of the summary; and instruction means for causing a computer to store the summary as a linked information of the one part in the first information.

32. A computer readable memory containing a computer-readable instructions to present information, comprising:

instruction means for causing a computer to store first information including at least one part corresponding to second information;

instruction means for causing a computer to display the first information;

instruction means for causing a computer to indicate the one part of the displayed first information to read the second information from a file;

instruction means for causing a computer to inquire to a server of the file whether the second information is accessible; and instruction means for causing a computer to display whether the second information is displayed or not.

33. A computer readable memory containing computer-readable instructions to present information, comprising:

instruction means for causing a computer to store first information including at least one part corresponding to second information stored in a file;

instruction means for causing a computer to display the first information;

instruction means for causing a computer to indicate the one part of the displayed first information;

instruction means for causing a computer to display an icon to select the type of data of the second information according to the type of data described in the one part of the first information; and instruction means for causing to read the second information corresponding to the selected type of data from the file.

34. A computer readable memory containing computer-readable instructions to present information, comprising:

instruction means for causing a computer to store first information including at least one part corresponding to second information stored in a file;

instruction means for causing a computer to display the first information;

instruction means for causing a computer to indicate the one part of the displayed first information;

instruction means for causing a computer to decide whether the second information is already stored or not;

instruction means for causing a computer to display an icon to determine whether a back read of the second information is executed or not if the second information is not stored; and instruction means for causing a computer to read the second information without displaying from the file if the back read is indicated.

35. A computer readable memory containing computer-readable instructions to present information, comprising:

instruction means for causing a computer to store first information including at least one part corresponding to second information;

instruction means for causing a computer to display the first information;

instruction means for causing a computer to indicate the one part of the displayed first information;

instruction means for causing a computer to read the second information from the file in response to the indication of the one part;

instruction means for causing a computer to replace the one part of the first information by the second information to create a compound information; and instruction means for causing a computer to display the compound information instead of the first information.

36. A computer readable memory containing computer-readable instructions to present information, comprising:

instruction means for causing a computer to read first information and second information from a file, wherein the first information includes at least one part corresponding to the second information;

instruction means for causing a computer to store the first information and the second information;

instruction means for causing a computer to determine whether the first information includes an extended description of the one part to check an update status of the second information;

instruction means for causing a computer to newly read the second information from the file if the first information includes the extended description;

instruction means for causing a computer to compare the new read second information with the stored second information;

instruction means for causing a computer to output reflection information of the update status from the comparison; and instruction means for causing a computer to present the first information to a user, wherein the reflection information is added to the one part the first information.

37. A computer readable memory containing computer-readable instructions to present an information distributed on a network, comprising:

instruction means for causing a computer to store a plurality of paths, each path representing a series of addresses, each address representing a location of each distributed piece of the information;

instruction means for causing a computer to select one path from the plurality of paths;

instruction means for causing a computer to display the one path as the series of addresses;

instruction means for causing a computer to select one address from the series of addresses;

instruction means for causing a computer to read the information from the network according to the one address; and instruction means for causing a computer to display the read information.

* * * * *